US012652207B2

(12) United States Patent
Shaked et al.

(10) Patent No.: US 12,652,207 B2
(45) Date of Patent: Jun. 9, 2026

(54) MODIFIED SUPER-QUADRATURE AMPLITUDE MODULATION (QAM) MODULATION SCHEMES BASED ON LOW ORDER MOTHER QAM

(71) Applicant: QUALCOMM Incorporated, San Diego, CA (US)

(72) Inventors: Ronen Shaked, Kfar Saba (IL); Gideon Shlomo Kutz, Ramat Hasharon (IL); Guy Wolf, Rosh Haayin (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/677,540

(22) Filed: May 29, 2024

(65) Prior Publication Data

US 2025/0373481 A1     Dec. 4, 2025

(51) Int. Cl.
| | |
|---|---|
| *H04L 27/34* | (2006.01) |
| *H04L 1/00* | (2006.01) |
| *H04L 27/00* | (2006.01) |
| *H04L 27/38* | (2006.01) |

(52) U.S. Cl.
CPC ........ *H04L 27/3472* (2013.01); *H04L 1/0003* (2013.01); *H04L 27/0008* (2013.01); *H04L 27/38* (2013.01)

(58) Field of Classification Search
CPC .............. H04L 27/3472; H04L 1/0003; H04L 27/0008; H04L 27/38
See application file for complete search history.

(56) References Cited

U.S. PATENT DOCUMENTS

| | | | |
|---|---|---|---|
| 7,957,482 B2 * | 6/2011 | Golitschek Edler Von Elbwart | ............... H04L 25/067 375/261 |
| 10,212,020 B2 * | 2/2019 | Kwon | ................. H04L 27/3405 |
| 2014/0035693 A1 | 2/2014 | Li et al. | |
| 2018/0123841 A1 | 5/2018 | Wilhelmsson et al. | |

(Continued)

FOREIGN PATENT DOCUMENTS

WO     WO-2018108886 A1 *   6/2018   ......... H04L 27/2604

OTHER PUBLICATIONS

International Search Report and Written Opinion—PCT/US2025/027174—ISA/EPO—Jul. 21, 2025.

*Primary Examiner* — Freshteh N Aghdam
(74) *Attorney, Agent, or Firm* — Seyfarth Shaw LLP

(57) ABSTRACT

A method for wireless communication at a user equipment (UE) includes receiving, from a network node, a first message querying a capability of the UE to support a modified high order quadrature amplitude modulation (QAM) scheme associated with a first constellation having a first group of regions, each region of the first constellation comprising a respective second constellation associated with a low order QAM scheme. The method further includes receiving, from the network node, a transmission in accordance with the modified high order QAM scheme based on the UE indicating the capability of the UE to support the modified high order QAM scheme. The transmission conveying a group of symbols, each symbol indicating a first set of bits indicating a first region of the first group of regions, and a second set of encoded bits indicating a constellation point in a respective second constellation comprised in the first region.

28 Claims, 15 Drawing Sheets

(56)          References Cited

U.S. PATENT DOCUMENTS

2020/0329369 A1    10/2020  Pals et al.
2023/0261924 A1*   8/2023  Zewail .................. H04L 1/0025
                                                         370/329

* cited by examiner

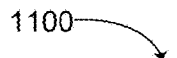
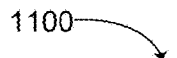
FIG. 11

1200 —➤

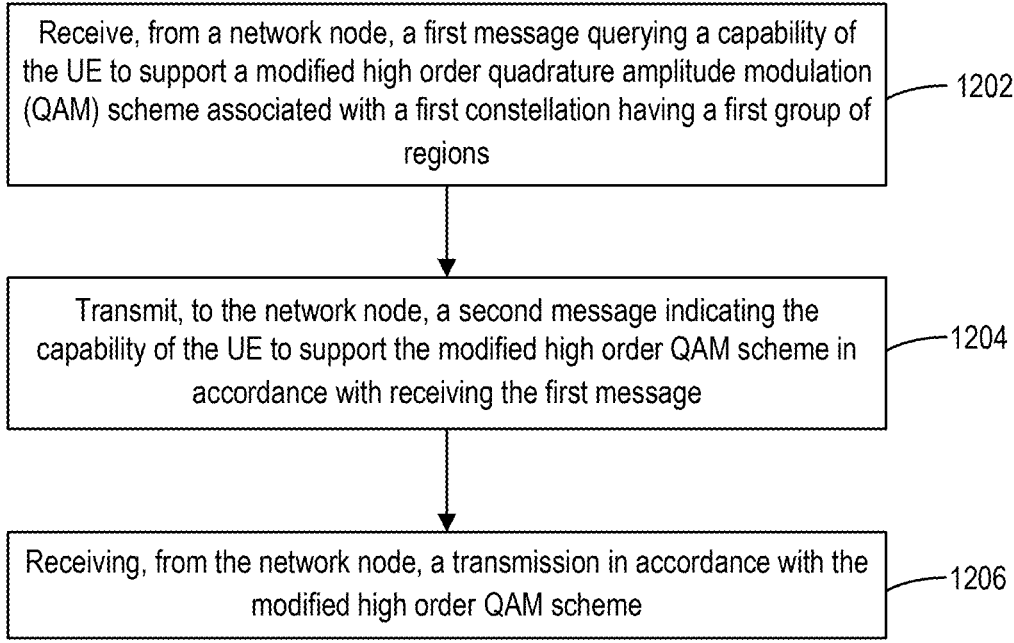

Receive, from a network node, a first message querying a capability of the UE to support a modified high order quadrature amplitude modulation (QAM) scheme associated with a first constellation having a first group of regions — 1202

Transmit, to the network node, a second message indicating the capability of the UE to support the modified high order QAM scheme in accordance with receiving the first message —1204

Receiving, from the network node, a transmission in accordance with the modified high order QAM scheme —1206

*FIG. 12*

Communications Manager

1315

QAM Capability Component

1330

Symbol Processing Component

1340

Receiver

1310

Transmitter

1320

1400 ⟶

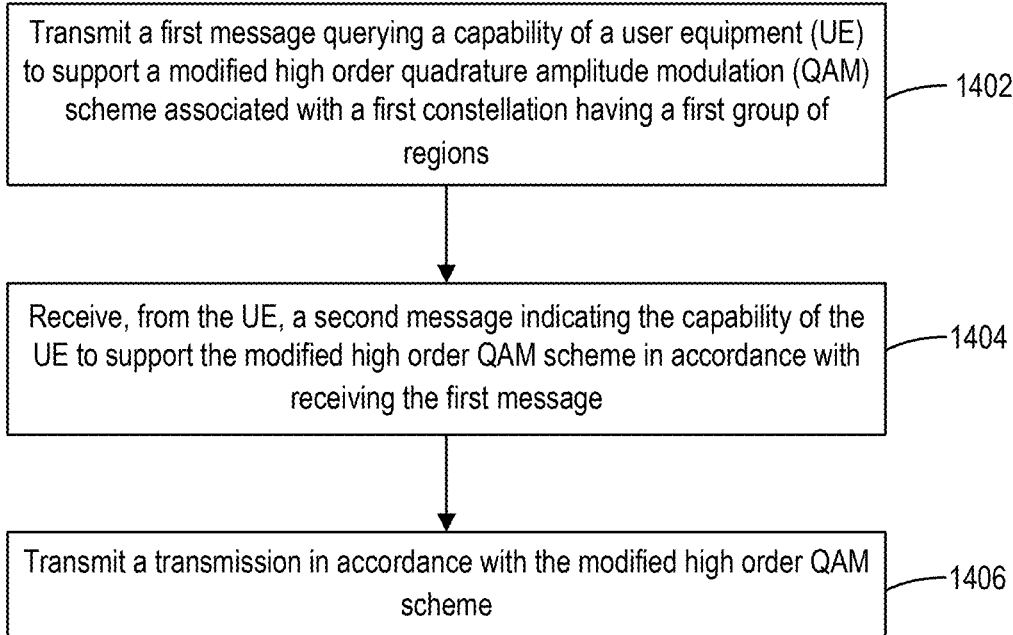

Transmit a first message querying a capability of a user equipment (UE) to support a modified high order quadrature amplitude modulation (QAM) scheme associated with a first constellation having a first group of regions — 1402

Receive, from the UE, a second message indicating the capability of the UE to support the modified high order QAM scheme in accordance with receiving the first message — 1404

Transmit a transmission in accordance with the modified high order QAM scheme — 1406

*FIG. 14*

MODIFIED SUPER-QUADRATURE AMPLITUDE MODULATION (QAM) MODULATION SCHEMES BASED ON LOW ORDER MOTHER QAM

FIELD OF THE DISCLOSURE

The present disclosure relates generally to wireless communications, and more specifically to modified super-quadrature amplitude modulation (QAM) modulations based on low order mother QAM.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (for example, bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP). Narrowband (NB)-Internet of things (IoT) and enhanced machine-type communications (eMTC) are a set of enhancements to LTE for machine type communications.

A wireless communications network may include a number of base stations (BSs) that can support communications for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail, a BS may be referred to as a Node B, an evolved Node B (eNB), a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (for example, also known as discrete Fourier transform spread OFDM (DFT-s-OFDM)) on the uplink (UL), as well as supporting beamforming, multiple-input multiple-output (MIMO) antenna technology, and carrier aggregation.

Quadrature amplitude modulation (QAM) is a signal modulation method that conveys data by altering both an amplitude and a phase of a carrier wave. QAM may be used to transmit multiple bits per symbol. The amplitude and phase of each symbol may be represented as a point on a constellation diagram. Therefore, a symbol in QAM is a specific state of the wave that represents a certain number of bits. In the case of 1024 (1 k-) QAM, each symbol may encode 10 bits. Higher-order QAM modulations may transmit an equivalent volume of data traffic in a reduced timeframe. For example, a 16,384 (16 k-) QAM symbol may encode 14 bits of data and a 4096 (4 k-) QAM symbol may encode 12 bits of data.

SUMMARY

In some aspects of the present disclosure, a method for wireless communication includes receiving, from a network node, a first message querying a capability of a user equipment (UE) to support a modified high order quadrature amplitude modulation (QAM) scheme associated with a first constellation having a first group of regions, each region of the first group of regions comprising a respective second constellation associated with a low order QAM scheme, each region of the first group of regions being separated from each adjacent region of the first group of regions by a gap that is larger than a spacing between adjacent constellation points in any one of the second constellations. The method further includes transmitting, to the network node, a second message indicating the capability of the UE to support the modified high order QAM scheme in accordance with receiving the first message. The method also includes receiving, from the network node, a transmission in accordance with the modified high order QAM scheme, the transmission conveying a group of symbols. Each symbol of the group of symbols indicating a respective group of bits that includes: a first set of bits indicating a first region of the first group of regions associated with the modified high order QAM scheme, and a second set of encoded bits indicating a constellation point in a respective second constellation comprised in the first region.

Other aspects of the present disclosure are directed to an apparatus. The apparatus includes means for receiving, from a network node, a first message querying a capability of the UE to support a modified high order QAM scheme associated with a first constellation having a first group of regions, each region of the first group of regions comprising a respective second constellation associated with a low order QAM scheme, each region of the first group of regions being separated from each adjacent region of the first group of regions by a gap that is larger than a spacing between adjacent constellation points in any one of the second constellations. The apparatus further includes means for transmitting, to the network node, a second message indicating the capability of the UE to support the modified high order QAM scheme in accordance with receiving the first message. The apparatus also includes means for receiving, from the network node, a transmission in accordance with the modified high order QAM scheme, the transmission conveying a group of symbols. Each symbol of the group of symbols indicating a respective group of bits that includes: a first set of bits indicating a first region of the first group of regions associated with the modified high order QAM scheme, and a second set of encoded bits indicating a constellation point in a respective second constellation comprised in the first region.

In other aspects of the present disclosure, a non-transitory computer-readable medium with program code recorded thereon is disclosed. The program code is executed by one or more processors and includes program code to receive, from a network node, a first message querying a capability of the UE to support a modified high order QAM scheme associated with a first constellation having a first group of regions, each region of the first group of regions comprising a respective second constellation associated with a low order QAM scheme, each region of the first group of regions being separated from each adjacent region of the first group of regions by a gap that is larger than a spacing between adjacent constellation points in any one of the second constellations. The program code still further includes program code to transmit, to the network node, a second message indicating the capability of the UE to support the modified high order QAM scheme in accordance with receiving the first message. The program code also includes program code to receive, from the network node, a transmission in accordance with the modified high order QAM scheme, the transmission conveying a group of symbols. Each symbol of the group of symbols indicating a respective group of bits that includes: a first set of bits indicating a first region of the first group of regions associated with the modified high order QAM scheme, and a second set of encoded bits indicating a constellation point in a respective second constellation comprised in the first region.

Other aspects of the present disclosure are directed to an apparatus, such as a UE, including one or more processors; and one or more memories coupled with the one or more processors and storing processor-executable code that, when executed by the one or more processors, is configured to cause the apparatus to receive, from a network node, a first message querying a capability of the UE to support a modified high order QAM scheme associated with a first constellation having a first group of regions, each region of the first group of regions comprising a respective second constellation associated with a low order QAM scheme, each region of the first group of regions being separated from each adjacent region of the first group of regions by a gap that is larger than a spacing between adjacent constellation points in any one of the second constellations. Execution of the processor-executable code further causes the apparatus to transmit, to the network node, a second message indicating the capability of the UE to support the modified high order QAM scheme in accordance with receiving the first message. Execution of the processor-executable code also causes the apparatus to receive, from the network node, a transmission in accordance with the modified high order QAM scheme, the transmission conveying a group of symbols. Each symbol of the group of symbols indicating a respective group of bits that includes: a first set of bits indicating a first region of the first group of regions associated with the modified high order QAM scheme, and a second set of encoded bits indicating a constellation point in a respective second constellation comprised in the first region.

In some aspects of the present disclosure, a method for wireless communication includes transmitting a first message querying a capability of a UE to support a modified high order QAM scheme associated with a first constellation having a first group of regions, each region of the first group of regions comprising a respective second constellation associated with a low order QAM scheme, each region of the first group of regions being separated from each adjacent region of the first group of regions by a gap that is larger than a spacing between adjacent constellation points in any one of the second constellations. The method further includes receiving, from the UE, a second message indicating the capability of the UE to support the modified high order QAM scheme in accordance with receiving the first message. The method also includes transmitting a transmission in accordance with the modified high order QAM scheme, the transmission conveying a group of symbols. Each symbol of the group of symbols indicating a respective group of bits that includes: a first set of bits indicating a first region of the first group of regions associated with the modified high order QAM scheme, and a second set of encoded bits indicating a constellation point in a respective second constellation comprised in the first region.

Other aspects of the present disclosure are directed to an apparatus. The apparatus includes means for transmitting a first message querying a capability of a UE to support a modified high order QAM scheme associated with a first constellation having a first group of regions, each region of the first group of regions comprising a respective second constellation associated with a low order QAM scheme, each region of the first group of regions being separated from each adjacent region of the first group of regions by a gap that is larger than a spacing between adjacent constellation points in any one of the second constellations. The apparatus further includes means for receiving, from the UE, a second message indicating the capability of the UE to support the modified high order QAM scheme in accordance with receiving the first message. The apparatus also includes means for transmitting a transmission in accordance with the modified high order QAM scheme, the transmission conveying a group of symbols. Each symbol of the group of symbols indicating a respective group of bits that includes: a first set of bits indicating a first region of the first group of regions associated with the modified high order QAM scheme, and a second set of encoded bits indicating a constellation point in a respective second constellation comprised in the first region.

In other aspects of the present disclosure, a non-transitory computer-readable medium with program code recorded thereon is disclosed. The program code is executed by one or more processors and includes program code to transmit a first message querying a capability of a UE to support a modified high order QAM scheme associated with a first constellation having a first group of regions, each region of the first group of regions comprising a respective second constellation associated with a low order QAM scheme, each region of the first group of regions being separated from each adjacent region of the first group of regions by a gap that is larger than a spacing between adjacent constellation points in any one of the second constellations. The program code further includes program code to receive, from the UE, a second message indicating the capability of the UE to support the modified high order QAM scheme in accordance with receiving the first message. The program code also includes program code to transmit a transmission in accordance with the modified high order QAM scheme, the transmission conveying a group of symbols. Each symbol of the group of symbols indicating a respective group of bits that includes: a first set of bits indicating a first region of the first group of regions associated with the modified high order QAM scheme, and a second set of encoded bits indicating a constellation point in a respective second constellation comprised in the first region.

Other aspects of the present disclosure are directed to an apparatus, such as a UE, including one or more processors; and one or more memories coupled with the one or more processors and storing processor-executable code that, when executed by the one or more processors, is configured to cause the apparatus to transmit a first message querying a capability of a UE to support a modified high order QAM scheme associated with a first constellation having a first group of regions, each region of the first group of regions comprising a respective second constellation associated with a low order QAM scheme, each region of the first group of regions being separated from each adjacent region of the first group of regions by a gap that is larger than a spacing between adjacent constellation points in any one of the second constellations. Execution of the processor-executable code further causes the apparatus to receive, from the UE, a second message indicating the capability of the UE to support the modified high order QAM scheme in accordance with receiving the first message. Execution of the processor-executable code also causes the apparatus to transmit a transmission in accordance with the modified high order QAM scheme, the transmission conveying a group of symbols. Each symbol of the group of symbols indicating a respective group of bits that includes: a first set of bits indicating a first region of the first group of regions associated with the modified high order QAM scheme, and a second set of encoded bits indicating a constellation point in a respective second constellation comprised in the first region.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

FIG. 11 is a block diagram illustrating an example wireless communication device that supports a modified high order QAM scheme, in accordance with various aspects of the present disclosure.

FIG. 12 is a flow diagram illustrating an example of a process for communicating in accordance with a modified high order QAM scheme, in accordance with various aspects of the present disclosure.

FIG. 14 is a flow diagram illustrating an example of a process for communicating in accordance with a modified high order QAM scheme, in accordance with various aspects of the present disclosure.

DETAILED DESCRIPTION

Figure 1:
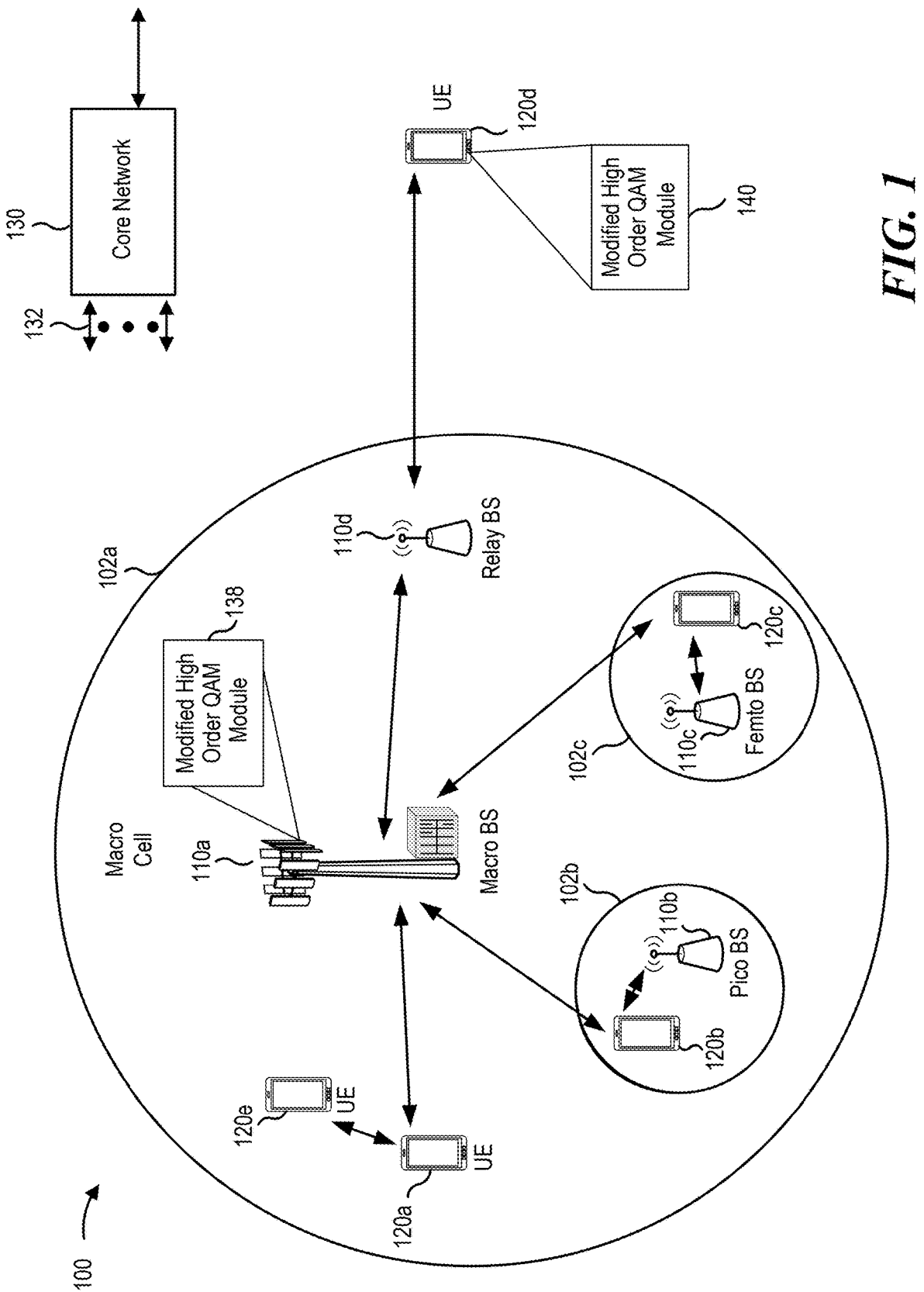
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

Radio frequency (RF) components, such as power amplifiers (PAs), often consume the most power in a wireless communication device. Therefore, reducing power consumption of the RF components may decrease the overall power consumption of the wireless communication device. Conventional wireless communication systems may use 1024 (1 k-) quadrature amplitude modulation (QAM) for data transmission. However, higher-order modulation schemes, such as 4096 (4 k-) QAM or 16,384 (16 k-) QAM, enable transmission of more data within a shorter time frame. Consequently, RF components in wireless communication devices that use higher-order modulation schemes, such as 4 k-QAM or 16 k-QAM, are associated with shorter activation times in comparison to RF components in wireless communication devices operating with 1 k-QAM or lower schemes. Shortening the activation time of RF components may reduce power consumption of the wireless communication device.

Currently, wireless communication devices may only support up to 1 k-QAM. Hardware upgrades are specified to support 4 k-QAM and/or 16 k-QAM. In some cases, software-defined radio technology may facilitate super-QAM schemes, such as 4 k-QAM and 16 k-QAM, on hardware designed for a 1 k-QAM scheme (for example, a low order scheme).

Various aspects of the present disclosure are directed to enabling super-QAM modulation schemes, such as 4 k-QAM and 16 k-QAM, on hardware designed for 1 k-QAM. In such aspects, because software-defined radio technology may support super-QAM schemes on hardware designed for a 1 k-QAM scheme, the super-QAM schemes may be referred to as modified super-QAM schemes. The modified super-QAM schemes may also be referred to as modified high order QAM schemes, hereinafter used interchangeably. In some examples, prior to communicating in accordance with the modified high order QAM scheme, a network node may transmit, to a user equipment (UE), a first message querying a capability of the UE to support the modified high order QAM scheme (for example, a 4 k-QAM scheme or a 16 k-QAM scheme). In such examples, the high order QAM scheme may be associated with a first constellation having a first group of regions. In some examples, for the 4 k-QAM scheme, the first group of regions includes four regions. In other examples for the 16 k-QAM scheme, the first group of regions includes sixteen regions.

Each region of the first constellation may represent a respective second constellation having a second group of regions, such as four regions (for example, four quadrants), that is associated with a low order QAM scheme (for example, the 1 k-QAM scheme). Additionally, each of the first group of regions may be separated from each adjacent region of the first group of regions by a gap that is larger than a spacing between adjacent constellation points in any one of the second constellations. In response to transmitting the first message, the network node may receive, from the UE, a second message indicating the capability of the UE to support the modified high order QAM scheme in accordance with receiving the first message. The network node may then perform one or more transmissions in accordance with the modified high order QAM scheme. Each of the one or more transmissions may convey a group of symbols, and each one of the group of symbols may indicate a respective group of bits that includes a first set of bits and a second set of encoded bits. The first set of bits may indicate a first region of the first group of regions associated with the modified high order QAM scheme. The second set of encoded bits indicate a constellation point in a respective second constellation comprised in the first region. Specifically, an amplitude and a phase of the second set of encoded bits indicate the second region of the second group of regions.

Particular aspects of the subject matter described in this disclosure can be implemented to realize one or more of the following potential advantages. In some examples, the described techniques of the respective group of bits, of each symbol of the group of symbols, including the first set of bits indicating a respective first quadrant of the first group of regions associated with the modified high order QAM scheme and a second set of encoded bits associated with a second region of the second group of regions associated with the low order QAM scheme, may enable a UE to support higher-order QAM schemes. By supporting the higher-order QAM schemes, the UE may receive data within a shorter time frame, in comparison to lower-order QAM schemes, thereby increasing network throughput while also reducing an activation time of RF components and reducing power consumption at the UE.

FIG. 1 is a diagram illustrating a wireless network 100 in which aspects of the present disclosure may be practiced. The wireless network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G Node B, an access point, a transmit and receive point (TRP), a network node, a network entity, and/or the like. A base station can be implemented as an aggregated base station, as a disaggregated base station, an integrated access and backhaul (IAB) node, a relay node, a sidelink node, etc. The base station can be implemented in an aggregated or monolithic base station architecture, or alternatively, in a disaggregated base station architecture, and may include one or more of a central unit (CU), a distributed unit (DU), a radio unit (RU), a near-real time (near-RT) RAN intelligent controller (RIC), or a non-real time (non-RT) RIC.

Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (for example, three) cells. The terms "eNB," "base station," "NR BS," "g B," "AP," "Node B," "5G NB," "TRP," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110*d* may communicate with macro BS 110*a* and a UE 120*d* in order to facilitate communications between the BS 110*a* and UE 120*d*. A relay station may also be referred to as a relay BS, a relay base station, a relay, and/or the like.

The wireless network 100 may be a heterogeneous network that includes BSs of different types (for example, macro BSs, pico BSs, femto BSs, relay BSs, and/or the like). These different types of BSs may have different transmit power levels, different coverage areas, and different impact on interference in the wireless network 100. For example, macro BSs may have a high transmit power level (for example, 5 to 40 watts) whereas pico BSs, femto BSs, and relay BSs may have lower transmit power levels (for example, 0.1 to 2 watts).

As an example, the BSs 110 (shown as BS 110*a*, BS 110*b*, BS 110*c*, and BS 110*d*) and the core network 130 may exchange communications via backhaul links 132 (for example, S1, etc.). Base stations 110 may communicate with one another over other backhaul links (for example, X2, etc.) either directly or indirectly (for example, through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (for example, S1, S2, etc.) and may perform radio configuration and scheduling for communications with the UEs 120. In some configurations, various functions of each access network entity or base station 110 may be distributed across various network devices (for example, radio heads and access network controllers) or consolidated into a single network device (for example, a base station 110).

UEs 120 (for example, 120*a*, 120*b*, 120*c*) may be dispersed throughout the wireless network 100, and each UE may be stationary or mobile. A UE may also be referred to as an access terminal, a terminal, a mobile station, a subscriber unit, a station, and/or the like. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless network 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The UEs 120 may include a modified high order QAM module 140. For brevity, only one UE 120*d* is shown as including the modified high order QAM module 140. The modified high order QAM module 140 may perform one or more operations, such as one or more operations of a process 1200 described with reference to FIG. 12.

Figure 3:
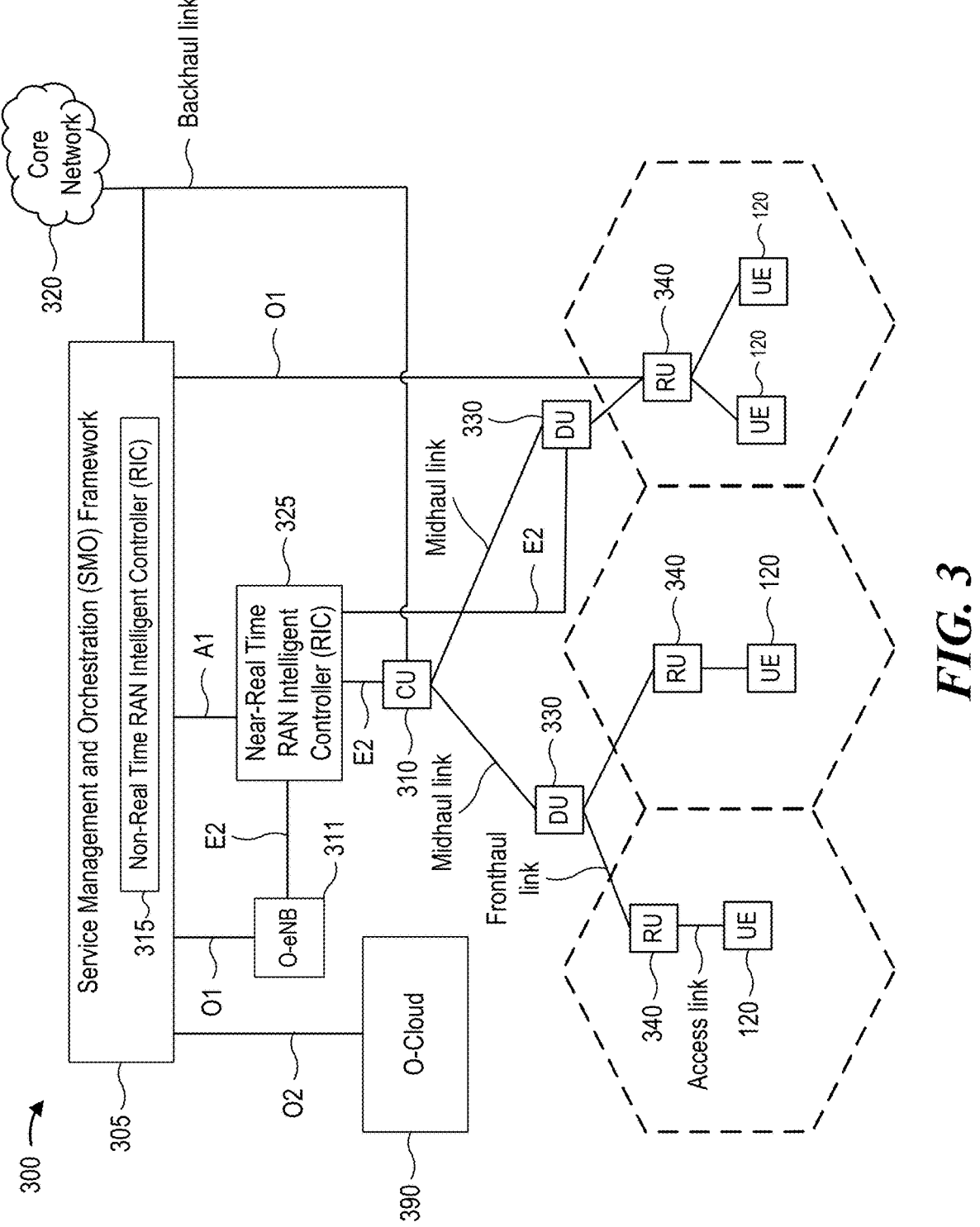
FIG. 3 is a block diagram illustrating an example disaggregated base station architecture, in accordance with various aspects of the present disclosure.

The core network 130 or the base stations 110 or any other network device (for example, as seen in FIG. 3) may include a modified high order QAM module 138 that performs one or more operations, such as one or more operations of a process 1400 described with reference to FIG. 14.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (for example, a system information block (SIB).

As indicated above, FIG. 1 is provided merely as an example. Other examples may differ from what is described with regard to FIG. 1.

Figure 2:
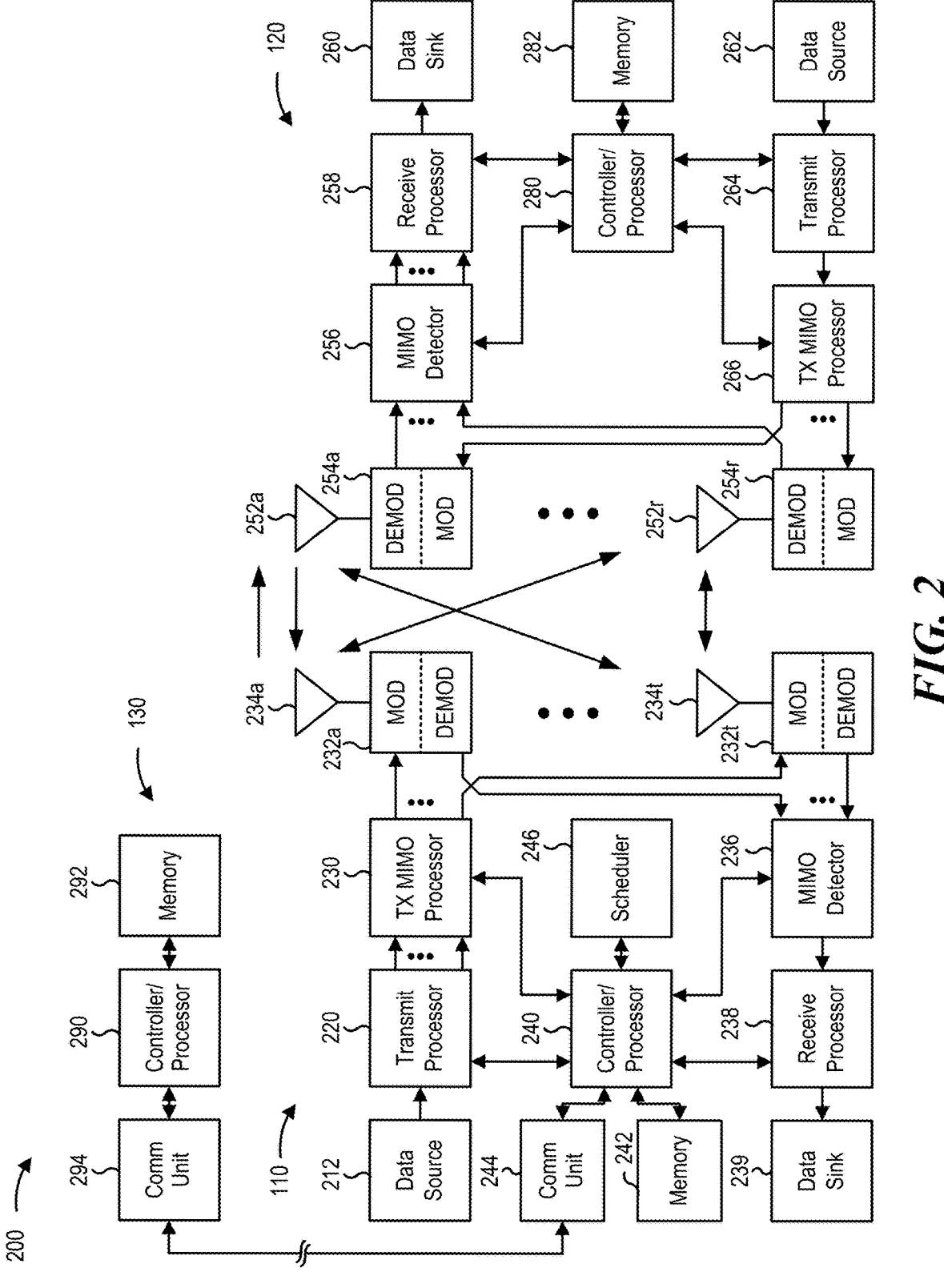
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (for example, encode and modulate) the data for each UE based at least in part on the MCS(s) selected for the UE, and provide data symbols for all UEs. Decreasing the MCS lowers throughput but increases reliability of the transmission. The transmit processor 220 may also process system information (for example, for semi-static resource partitioning information (SRPI) and/or the like) and control information (for example, CQI requests, grants, upper layer signaling, and/or the like) and provide overhead symbols and control symbols. The transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, and/or the reference symbols, if applicable, and may provide T output symbol streams to T modulators (MODs) 232a through 232t. Each modulator 232 may process a respective output symbol stream (for example, for orthogonal frequency division multiplexing (OFDM) and/or the like) to obtain an output sample stream. Each modulator 232 may further process (for example, convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (for example, filter, amplify, downconvert, and digitize) a received signal to obtain input samples. Each demodulator 254 may further process the input samples (for example, for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (for example, demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (for example, for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (for example, for discrete Fourier transform spread OFDM (DFT-s-OFDM), CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with supporting a modified high order QAM scheme as described in more detail elsewhere. For example, the controller/processor 240 of the base station 110, the controller/processor 280 of the UE 120, and/or any other component(s) of FIG. 2 may perform or direct operations of, for example, the processes of FIGS. 12 and 14 and/or other processes as described. Memories 242 and 282 may store data and program codes for the base station 110 and UE 120, respectively. A scheduler 246 may schedule UEs for data transmission on the downlink and/or uplink.

As indicated above, FIG. 2 is provided merely as an example. Other examples may differ from what is described with regard to FIG. 2.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), an evolved NB (eNB), an NR BS, 5G NB, an access point (AP), a transmit and receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units (for example, a virtual central unit (VCU), a virtual distributed unit (VDU), or a virtual radio unit (VRU)).

Base station-type operations or network designs may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

In some cases, different types of devices supporting different types of applications and/or services may coexist in a cell. Examples of different types of devices include UE handsets, customer premises equipment (CPEs), vehicles, Internet of Things (IoT) devices, and/or the like. Examples of different types of applications include ultra-reliable low-latency communications (URLLC) applications, massive machine-type communications (mMTC) applications, enhanced mobile broadband (eMBB) applications, vehicle-to-anything (V2X) applications, and/or the like. Furthermore, in some cases, a single device may support different applications or services simultaneously.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a near-real time (near-RT) RAN intelligent controller (RIC) 325 via an E2 link, or a non-real time (non-RT) RIC 315 associated with a service management and orchestration (SMO) framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 120 via one or more radio frequency (RF) access links. In some implementations, the UE 120 may be simultaneously served by multiple RUs 340.

Each of the units (for example, the CUs 310, the DUs 330, the RUs 340, as well as the near-RT RICs 325, the non-RT RICs 315, and the SMO framework 305) may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (for example, central unit—user plane (CU-UP)), control plane functionality (for example, central unit—control Plane (CU-CP)), or a combination thereof. In some implementations, the CU 310 can be logically split into one or more CU-UP units and one or more CU-CP units. The CU-UP unit can communicate bi-directionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the Third Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO framework 305 may be configured to support RAN deployment and provisioning of non-virtualized and virtualized network elements. For non-virtualized network elements, the SMO framework 305 may be configured to support the deployment of dedicated physical resources for RAN coverage requirements, which may be managed via an operations and maintenance interface (such as an O1 interface). For virtualized network elements, the SMO framework 305 may be configured to interact with a cloud computing platform (such as an open cloud (O-cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340, and near-RT RICs 325. In some implementations, the SMO framework 305 can communicate with a hardware aspect of a 4G RAN, such as an open eNB (O-eNB) 311, via an O1 interface. Additionally, in some implementations, the SMO framework 305 can communicate directly with one or more RUs 340 via an O1 interface. The SMO framework 305 also may include a non-RT RIC 315 configured to support functionality of the SMO framework 305.

The non-RT RIC 315 may be configured to include a logical function that enables non-real-time control and optimization of RAN elements and resources, artificial intelligence/machine learning (AI/ML) workflows including model training and updates, or policy-based guidance of applications/features in the near-RT RIC 325. The non-RT RIC 315 may be coupled to or communicate with (such as via an A1 interface) the near-RT RIC 325. The near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as the O-eNB 311, with the near-RT RIC 325.

In some implementations, to generate AI/ML models to be deployed in the near-RT RIC 325, the non-RT RIC 315 may receive parameters or external enrichment information from external servers. Such information may be utilized by the near-RT RIC 325 and may be received at the SMO framework 305 or the non-RT RIC 315 from non-network data sources or from network functions. In some examples, the non-RT RIC 315 or the near-RT RIC 325 may be configured to tune RAN behavior or performance. For example, the non-RT RIC 315 may monitor long-term trends and patterns for performance and employ AI/ML models to perform corrective actions through the SMO framework 305 (such as reconfiguration via O1) or via creation of RAN management policies (such as A1 policies).

RF components, such as PAs, often consume the most power in a wireless communication device. Therefore, reducing power consumption of the RF components may decrease the overall power consumption of the wireless communication device. Conventional wireless communication systems may use 1 k-QAM for data transmission. However, higher-order modulation schemes, such as 4 k-QAM or 16 k-QAM, allow for more data to be transmitted within a shorter time frame than lower-order modulation schemes. Consequently, RF components in wireless communication devices that use higher-order modulation schemes, such as 4 k-QAM or 16 k-QAM, are associated with shorter activation times in comparison to RF components in wireless communication devices operating with 1 k-QAM or lower schemes. Shortening the activation time of RF components reduces the power consumption of the wireless communication device.

Currently, wireless communication devices may only support up to 1 k-QAM. Hardware upgrades are specified to support 4 k-QAM and/or 16 k-QAM. In some cases, software-defined radio technology may facilitate super-QAM modulation schemes, such as 4 k-QAM and 16 k-QAM, on hardware designed for 1 k-QAM.

Figure 4:
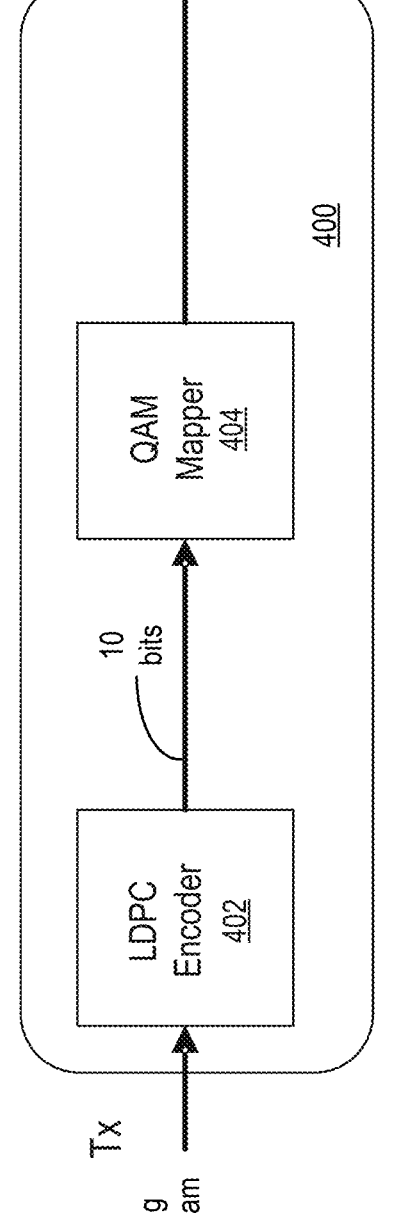
FIG. 4 is a block diagram illustrating an example of a transmitter specified for 1024 (1 k-) quadrature amplitude modulation (QAM).

FIG. 4 is a block diagram illustrating an example of a transmitter 400 specified for 1 k-QAM. In the example of FIG. 4, the transmitter 400 may be a transmitter at a wireless communication device, such as a base station 110, as described with reference to FIGS. 1 and 2, a UE 120 as described with reference to FIGS. 1-3, or a CU 310, DU 330, or RU 340 as described with reference to FIG. 3. For ease of explanation, only two components of the transmitter 400 are shown. Specifically, as shown in the example of FIG. 4, the transmitter 400 includes a low-density parity-check (LDPC) encoder 402 and a quadrature amplitude modulation (QAM) mapper 404.

The LDPC encoder 402 may improve data reliability. In some examples, the LDPC encoder 402 adds error correction codes to an incoming data stream 406, creating a set of parity bits that may be used by a receiver to check for transmission errors. The LDPC encoder 402 outputs data in blocks. In the example of FIG. 4, the output is formatted into 10-bit blocks in accordance with a 10-bit bus width that satisfies the 1 k-QAM scheme.

The 10-bit output from the LDPC encoder 402 is received at the QAM mapper 404. The QAM mapper 404 may translate the binary bits into complex symbols that represent both amplitude and phase changes in the carrier signal. Each symbol may encode a combination of bits, with the QAM mapper 404 being limited to 1024 distinct symbols. This limitation corresponds to the 1 k-QAM modulation format, where each symbol represents any one of 1024 possible values, effectively encoding 10 bits of data.

The constraints of the transmitter 400 are exemplified by the bus width and mapper size. The bus width, limited to 10 bits, defines a maximum amount of data (for example, binary data) that may be transmitted at one time from the LDPC encoder 402 to the QAM mapper 404. The mapper size refers to the symbol capacity, which is limited to 1024 unique symbols in accordance with the 1 k-QAM scheme. While the transmitter 400 may support the transmission signals in accordance with the 1 k-QAM scheme, the transmitter 400 is not inherently equipped to support higher-order modulation schemes such as 4 k-QAM or 16 k-QAM, which may transmit more data per symbol, such as 12 bits and 14 bits, respectively.

In some examples, a transmitter, such as the transmitter 400, may be adapted through software upgrades to support higher-order modulation schemes such as 4 k-QAM or 16 k-QAM. Such upgrades may support higher-order QAM modulations without necessitating hardware upgrades, thereby preserving the existing hardware design of the transmitter while extending the functional scope of the transmitter to accommodate higher data rates.

Figure 5:
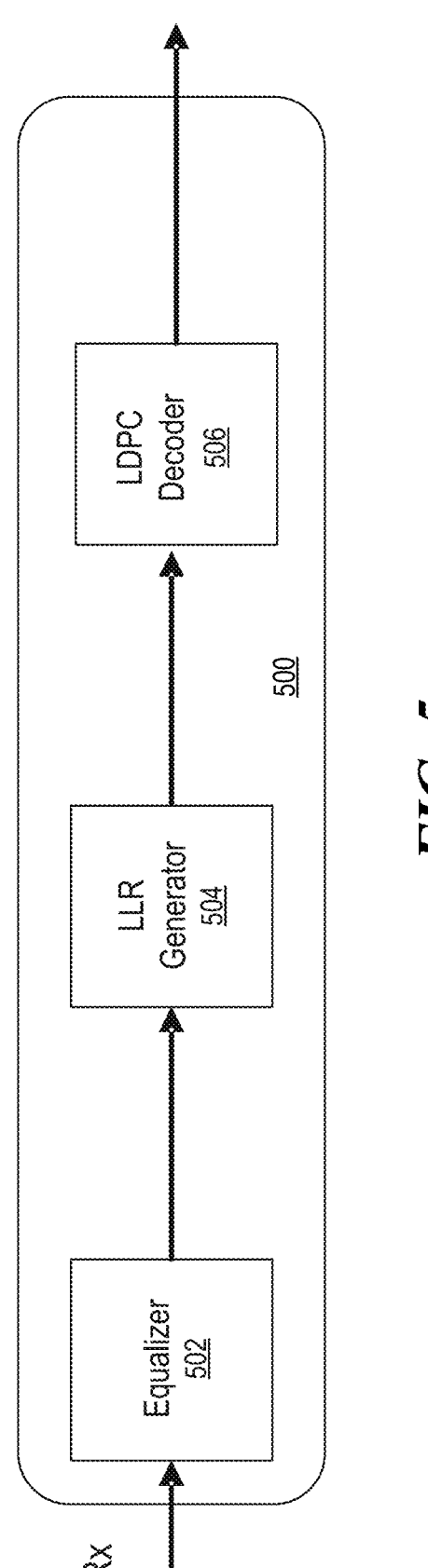
FIG. 5 is a block diagram illustrating an example of a receiver specified for 1 k-QAM.

FIG. 5 is a block diagram illustrating an example of a receiver 500 specified for 1 k-QAM. In the example of FIG. 5, the receiver 500 may be a receiver at a wireless communication device, such as a base station 110 as described with reference to FIGS. 1 and 2, a UE 120 as described with reference to FIGS. 1-3, or a CU 310, DU 330, or RU 340 as described with reference to FIG. 3. For ease of explanation, only three components of the receiver 500 are shown. Specifically, as shown in the example of FIG. 5, the receiver 500 includes an equalizer 502, a log-likelihood ratio (LLR) generator 504, and an LDPC decoder 506.

In the example of FIG. 5, the equalizer 502 processes a signal received from a transmitter, such as the transmitter 400 described with reference to FIG. 4, and corrects for distortion in a received signal caused by a transmission channel. The LLR generator 504 converts received symbols into log-likelihood ratios, which quantify a likelihood that a received symbol corresponds to a zero or a one. In the example of FIG. 5, the bus width at the output of the LLR generator 504 is restricted to 10 LLR units, which aligns with the 10 bits associated with each 1 k-QAM symbol. Furthermore, the values of the generated LLRs are constrained to match an alphabet size of up to 1,024 symbols. This size corresponds to the 1 k-QAM scheme, where each of the 1,024 unique symbol points in a modulation constellation represents a different combination of 10 bits.

In the example of FIG. 5, the LDPC decoder 506 serves as the final stage in the receiver path. The LDPC decoder 506 may be specified to decode data encoded with an LDPC code. The LDPC decoder 506 may operate on a set of iterative functions, which progressively refine the estimates of the transmitted data. In some cases, the LDPC decoder 506 uses a soft-decoding approach to process probability values, such as values generated by the LLR generator 504, rather than absolute bit values.

As discussed below, the design of the receiver 500, which is tailored for the 1 k-QAM scheme, may be adapted for higher-order QAM schemes such as 4 k-QAM or 16 k-QAM. In some examples, the receiver 500 may be adapted through software upgrades to support the higher-order QAM schemes. By supporting the higher-order QAM schemes, the receiver 500 may accommodate higher data throughput rates.

Various aspects of the present disclosure are directed to enabling super-QAM modulation schemes, such as 4 k-QAM and/or 16 k-QAM, on hardware designed for 1 k-QAM. In some examples, a higher-order QAM scheme, such as a 4 k-QAM scheme or a 16 k-QAM scheme, is a composite of multiple offset replicas of a 1 k-QAM scheme modulation constellation. For ease of explanation, the 1 k-QAM scheme may be referred to as a mother scheme or a mother 1 k-QAM (hereinafter used interchangeably).

In some examples, hardware specified to process 10 bits per symbol for a 1 k-QAM scheme may be used for a modified 4 k-QAM scheme that is specified to carry 12 bits per symbol. In such examples, a modulation constellation associated with the modified 4 k-QAM scheme may be synthesized from four offset replicas of a modulation constellation associated with the 1 k-QAM scheme. The modulation constellation associated with the 1 k-QAM scheme may be referred to as the 1 k-QAM constellation, and the modulation constellation associated with the 4 k-QAM scheme may be referred to as the 4 k-QAM constellation. In such examples, the 1 k-QAM scheme continues to function in accordance with the current specifications. Specifically, ten bits per symbol may be mapped to a quadrant (for example, region) of the 1 k-QAM constellation using conventional mappings, such as gray coding or other defined mapping functions. To enable the additional data capacity of the 4 k-QAM scheme, two new bits may indicate a specific quadrant of the four offset replica quadrants within the overall 4 k-QAM constellation. Thus, these two bits expand the effective constellation of the mother QAM without altering the inherent mapping of the original 10 bits.

Figure 6A:
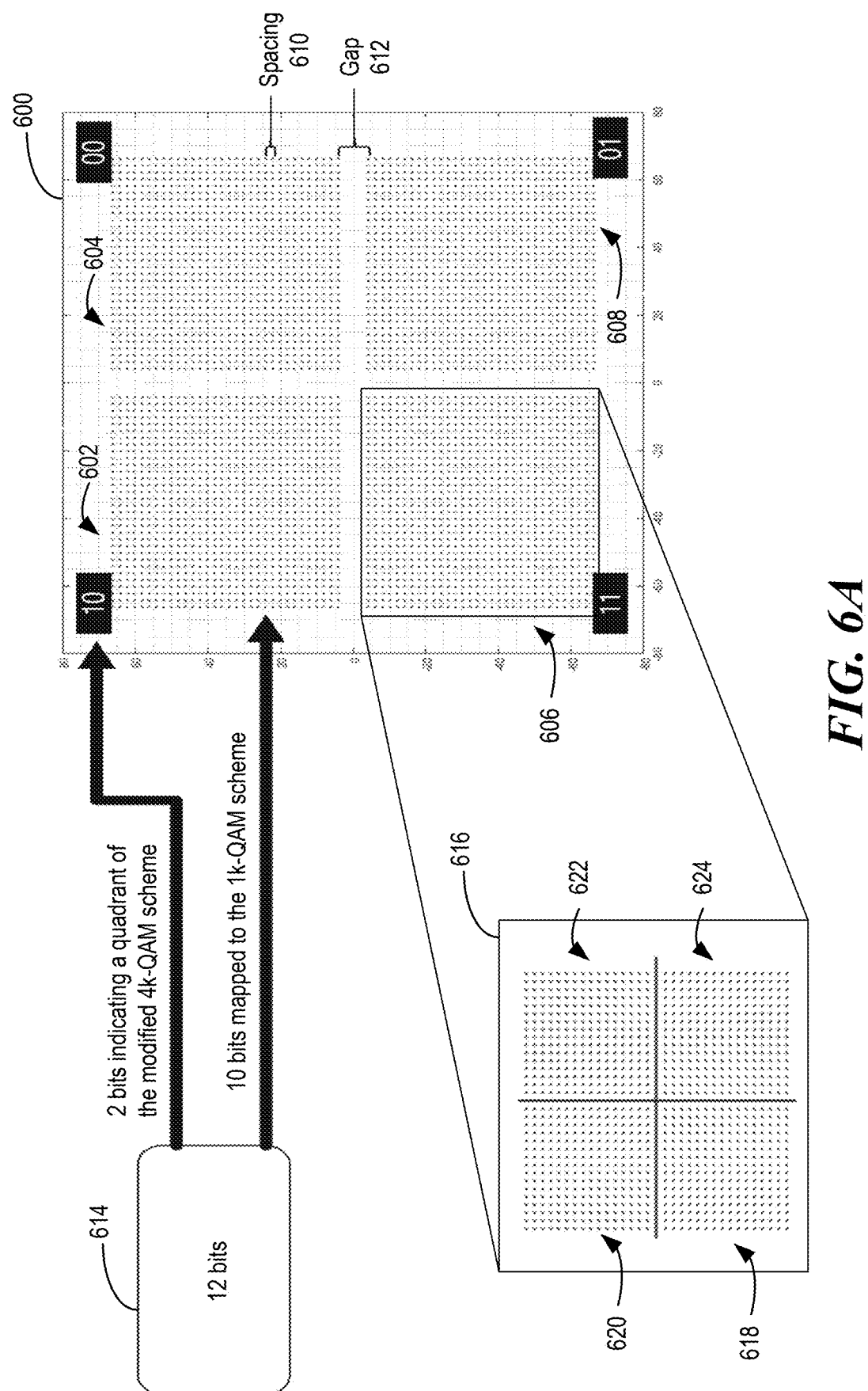
FIG. 6A is a block diagram illustrating an example of a modified 4096 (4 k-) QAM scheme, in accordance with various aspects of the present disclosure.

FIG. 6A is a block diagram illustrating an example of a modified 4 k-QAM scheme, in accordance with various aspects of the present disclosure. In the example of FIG. 6A, the modified 4 k-QAM scheme is associated with a 4 k-QAM constellation 600 having four quadrants 602, 604, 606, and 606. Each quadrant 602, 604, 606, and 606 may also be referred to as a region. Each quadrant 602, 604, 606, and 608 of the 4 k-QAM constellation 600 includes a respective 1 k-QAM constellation 616 having four quadrants 618, 620, 622, and 624. For ease of explanation, only one 1 k-QAM constellation 616 is illustrated in the example of FIG. 6A. Each quadrant 602, 604, 606, and 608 of the 4 k-QAM constellation may be separated from an adjacent quadrant 602, 604, 606, and 608 by a gap 612 that is larger than a spacing 610 between adjacent constellation points in any one of the quadrants in the 1 k-QAM constellation 616.

In the example of FIG. 6A, a UE may receive, from a network node, one or more transmissions in accordance with the modified 4 k-QAM scheme. Each transmission may convey a group of symbols, and each symbol 614 of the group of symbols indicates a respective group of bits. Specifically, for the modified 4 k-QAM scheme, each symbol 614 of the group of symbols indicates 12 bits. In such examples, two bits indicate a respective first quadrant of the four quadrants 602, 604, 606, and 608 associated with the 4 k-QAM constellation 600. As shown in the example of FIG. 6A, each of the four quadrants 602, 604, 606, and 608 may be associated with a two-bit binary number "00," "01," "10," and "11." Therefore, the two bits may correspond to the two-bit binary number associated with one of the four quadrants 602, 604, 606, and 608. Furthermore, the remaining ten bits may be encoded bits that are associated with a respective second quadrant of the four quadrants 618, 620, 622, and 624, associated with the one 1 k-QAM constellation 616, that is represented in the first quadrant, of the 4 k-QAM constellation 600, associated with the two bits of the 12-bit symbol 614. In some examples, an amplitude and a phase of the remaining ten bits indicate the respective second quadrant of the four quadrants 618, 620, 622, and 624 associated with the one 1 k-QAM constellation 616. The ten bits may map to the respective second quadrant via conventional QAM mapping, such as gray mapping or another mapping.

Figure 6B:
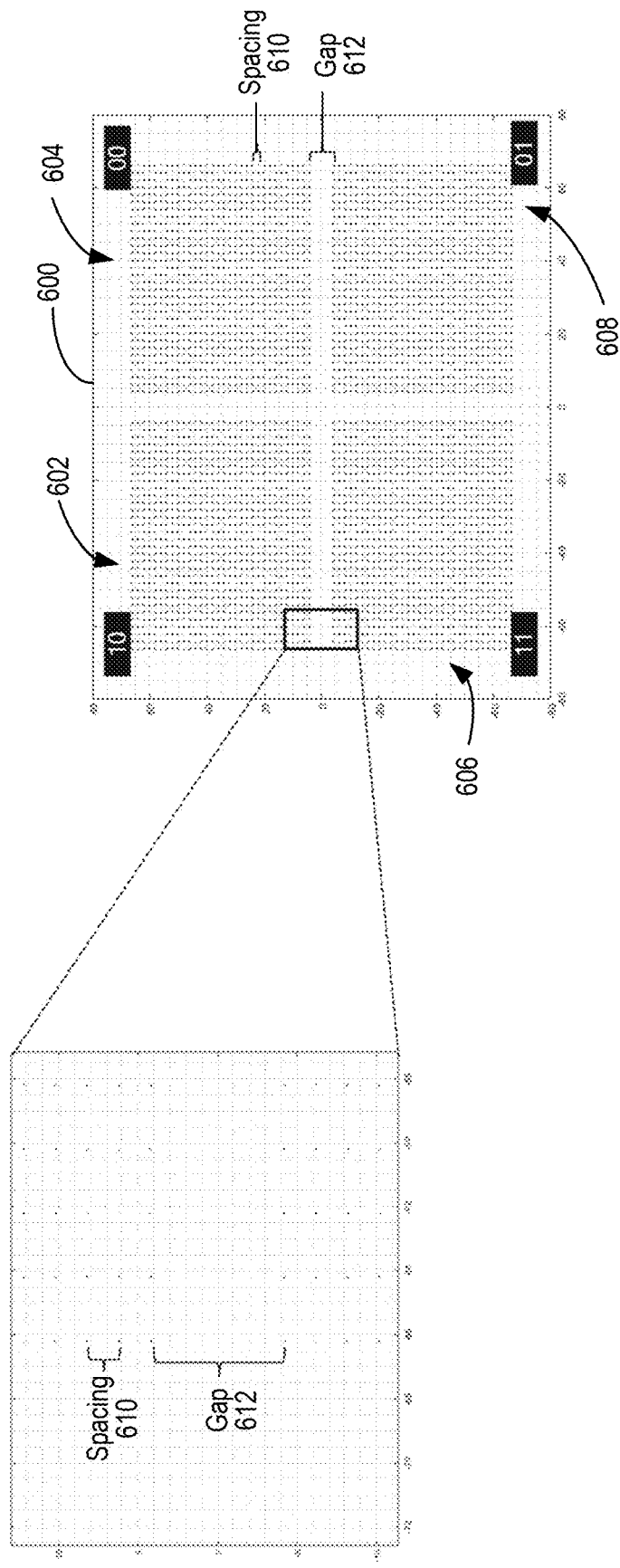
FIG. 6B is a block diagram illustrating an example of a gap between quadrants associated with a 4 k-QAM constellation, in accordance with various aspects of the present disclosure.

FIG. 6B is a block diagram illustrating an example of a gap between quadrants associated with a 4 k-QAM constellation 600, in accordance with various aspects of the present disclosure. As discussed, each quadrant 602, 604, 606, and 608 of the 4 k-QAM constellation 600 may be separated from an adjacent quadrant 602, 604, 606, and 608 by a gap 612 that is larger than the spacing 610 between adjacent constellation points in any one of the 1 k-QAM constellations. In some examples, for the modified 4 k-QAM scheme, the upper two bits are not protected by conventional coding methods. To mitigate the lack of code protection (for example, LDPC code protection), these two bits are safeguarded from transmission errors by increasing a Euclidean distance between adjacent quadrants 602, 604, 606, and 608 of the 4 k-QAM constellation 600. As an example, increasing the Euclidean distance between adjacent quadrants 602, 604, 606, and 608 may decrease a bit error rate (BER). In some examples, the Euclidean distance may be increased by a factor of four at the edges of the quadrants 602, 604, 606, and 608 of the 4 k-QAM constellation 600, such that the gap 612 is four times larger than a space 610 between adjacent constellation points in any one of the 1 k-QAM constellations. Additionally, further away from quadrant edges, the Euclidean distance increases, thereby increasing transmission error protection for the upper two bits. The placement of the gap 612 improves error tolerance for the bits that may be vulnerable to transmission errors. In contrast, the ten bits are less vulnerable to transmission errors because the ten bits may be encoded by an LDPC code.

Various aspects of the present disclosure are not limited to the gap 612 at an edge of each quadrant 602, 604, 606, and 608 of the 4 k-QAM constellation 600 being four times the space 610 between adjacent constellation points in any one of the 1 k-QAM constellations. Other factors are contemplated for the gap 612. The factor (for example, four times) may be selected in order to balance a BER associated with the code protected ten bits and a BER associated with the unprotected two bits. That is, it may be desirable for both the upper two bits and the remaining ten bits to have similar BERs.

Figure 7:
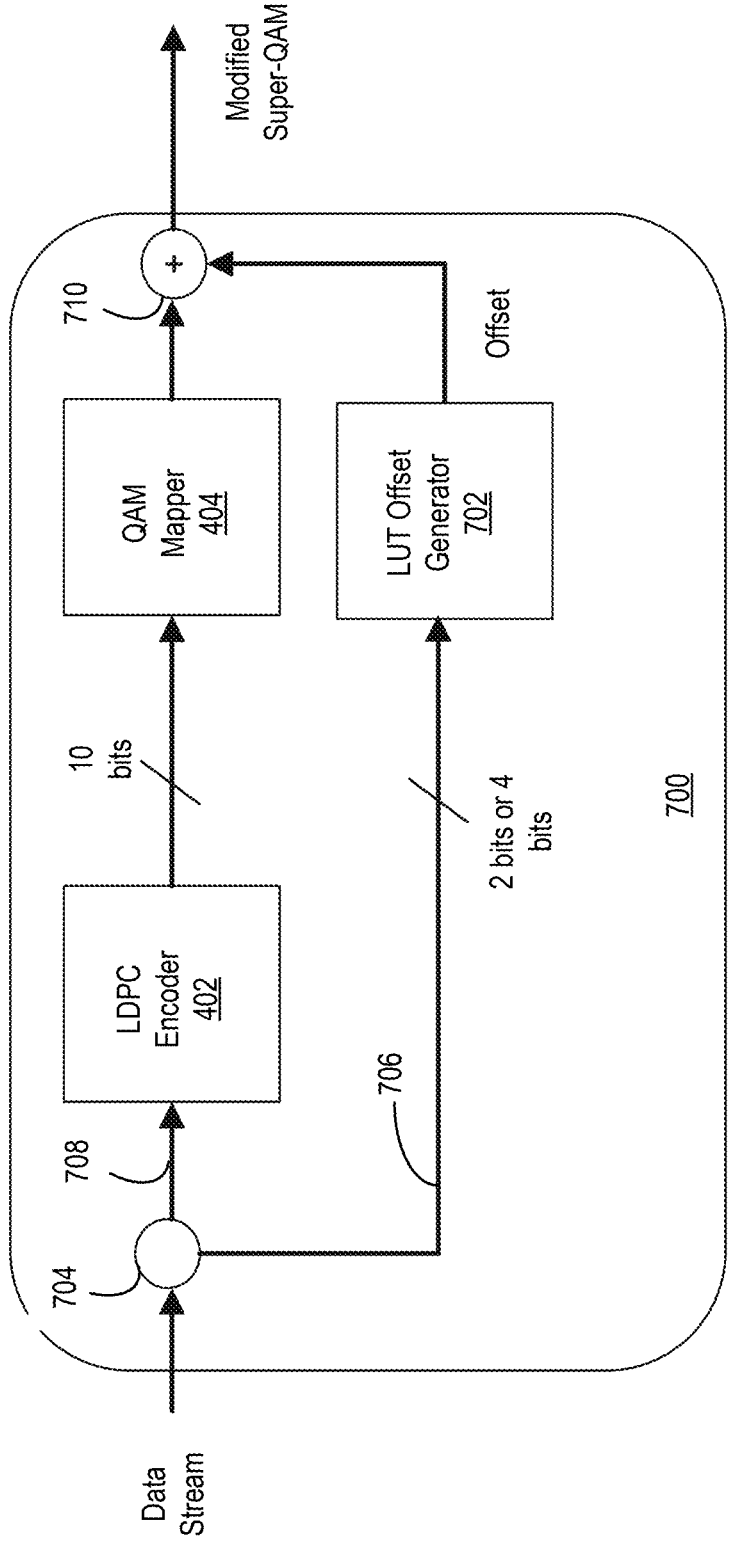
FIG. 7 is a block diagram illustrating an example of a transmitter that supports a modified super-QAM scheme, in accordance with various aspects of the present disclosure.

As discussed, in some examples, hardware specified for a lower-order QAM scheme, such as a 1 k-QAM scheme, may be modified via software to support a modified super-QAM scheme. FIG. 7 is a block diagram illustrating an example of a transmitter 700 that supports a modified super-QAM scheme, in accordance with various aspects of the present disclosure. The transmitter 700 may be an example of a transmitter at a wireless communication device, such as a base station 110 as described with reference to FIGS. 1 and 2, a UE 120 as described with reference to FIGS. 1-3, or a CU 310, DU 330, or RU 340 as described with reference to FIG. 3.

In the example of FIG. 7, a data stream is specified for transmission to a receiving device, such as a UE 120 described with reference to FIGS. 1, 2, and 3. The data stream include twelve bits for the 4 k-QAM scheme or fourteen bits for a 16 k-QAM scheme. In such examples, a splitter 704 divides the data stream into two parts, such as a first set of bits and a second set of bits. In some examples, the first set of bits may be an upper set of bits, such as two bits or four bits. Additionally, the second set of bits may be ten bits. The first set of bits may be processed via a software path 706 with a two-bit bus or a four-bit bus that may be dependent on the modified super-QAM scheme. In the software path 706, a lookup table (LUT) offset generator 702 generates an offset that indicates a respective first quadrant of a group of quadrants associated with the modified super-QAM scheme, such as the 4 k-QAM scheme or the 16 k-QAM scheme. The second set of bits may be processed via a hardware path 708 that includes an LDPC encoder 402 and a QAM mapper 404. The operations of the LDPC encoder 402 and the QAM mapper 404 are the same as the operations described with reference to FIG. 4. For brevity, the operations of the LDPC encoder 402 and the QAM mapper 404 will not be further described with respect to FIG. 7. As shown in the example of FIG. 7, the offset generated by the LUT offset generator 702 may be concatenated with an output of the QAM mapper 404 to generate the modified super-QAM output (for example, a modified super-QAM symbol).

Figure 8:
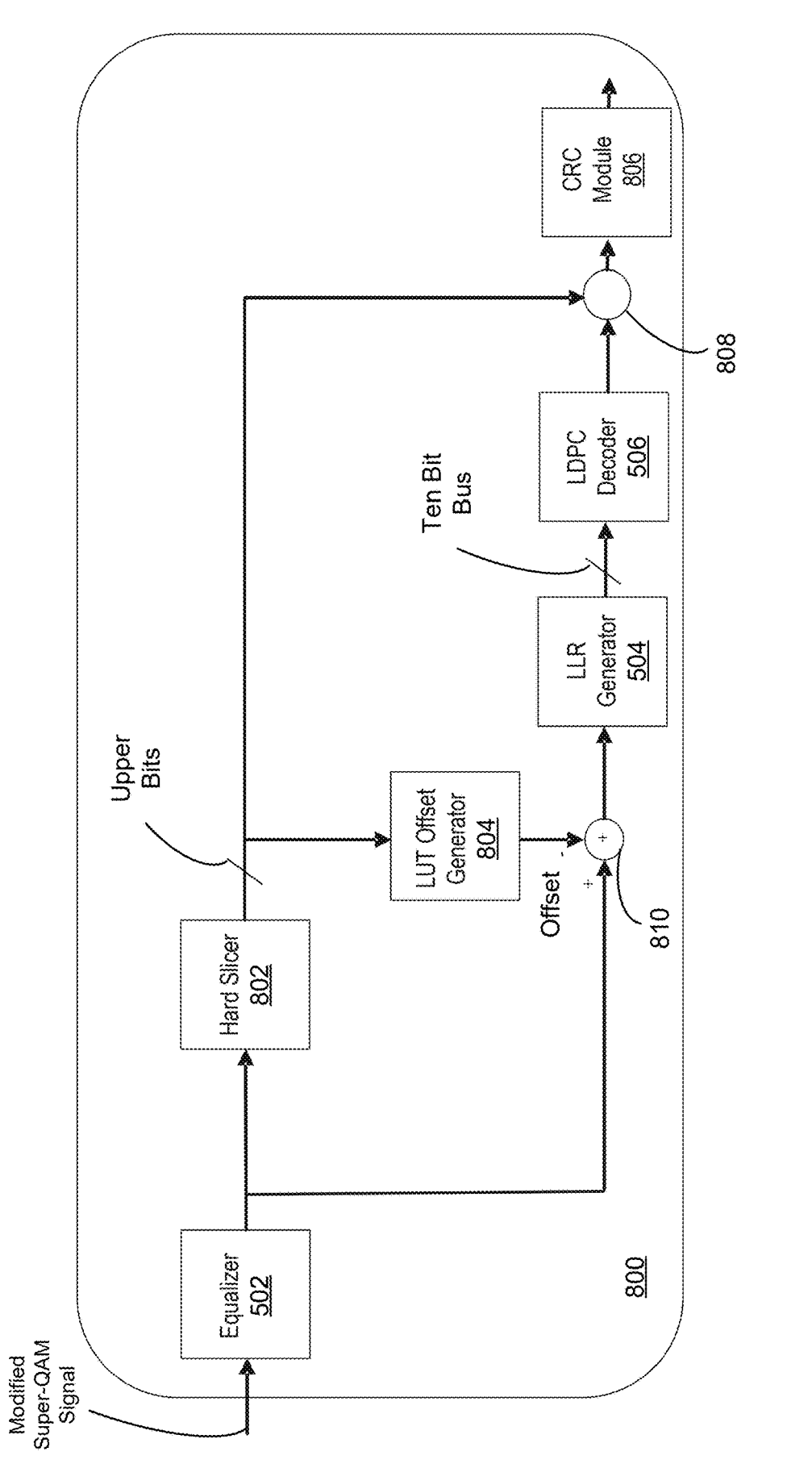
FIG. 8 is a block diagram illustrating an example of a receiver that supports a modified super-QAM scheme, in accordance with various aspects of the present disclosure.

FIG. 8 is a block diagram illustrating an example of a receiver 800 that supports a modified super-QAM scheme, in accordance with various aspects of the present disclosure. In the example of FIG. 8, the receiver 800 may be a receiver at a wireless communication device, at a wireless communication device, such as a base station 110 as described with reference to FIGS. 1 and 2, a UE 120 as described with reference to FIGS. 1-3, or a CU 310, DU 330, or RU 340 as described with reference to FIG. 3. In the example of FIG. 8, the receiver 800 includes an equalizer 502, a hard slicer 802, a lookup table (LUT) offset generator 804, an LLR generator 504, an LDPC decoder 506, and a cyclic redundancy check (CRC) module 806. In the example of FIG. 8, the equalizer 502, LLR generator 504, and LDPC decoder 506 perform operations similar to the operations described with reference to the operations described with reference to FIG. 5. Therefore, for brevity, the description of the operations of the equalizer 502, the LLR generator 504, and the LDPC decoder 506 will be limited with respect to the example of FIG. 8. The hard slicer 802 and the LUT offset generator 804 may be implemented by software. The equalizer 502, the LLR generator 504, and the LDPC decoder 506 may be implemented by hardware.

As shown in the example of FIG. 8, the receiver 800 receives a modified super-QAM signal, such as a modified 4 k-QAM signal or a modified 16 k-QAM signal. After processing the modified super-QAM signal by the equalizer 502, the hard slicer 802 may perform region slicing (for example, quadrant slicing) to determine the upper bits (for example, a first set of bits) of a respective group of bits included in each symbol of a group of symbols conveyed in modified super-QAM signal. In some examples, the I (in-phase) and Q (quadrature) components of the symbol may indicate a specific quadrant. For example, in the modified 4 k-QAM scheme, if both I and Q components are positive, the quadrant is an upper right quadrant, and the upper two bits are represented as "00". For the 4 k-QAM scheme, the hard slicer 802 generates two bits representing the upper bits associated with a respective first quadrant of the first group of quadrants. For the 16 k-QAM scheme, the hard slicer 802 generates four bits representing the upper bits associated with a respective first quadrant of the first group of quadrants. Specifically, for the 16 k-QAM scheme, the hard slicer 802 processes the in-phase (I) and quadrature (Q) components separately. The operation begins by comparing each component against three defined thresholds: 0, a positive threshold (T), and a negative threshold (−T). This comparison is used to map the signal to a particular region in a constellation. In some examples, for the I component, if the value is less than −T (I←T), the lower two bits are set to "10". If the value is between −T and 0 (−T<I<0), the lower two bits are set to 11. For values between 0 and T (0<I<T), the lower two bits are 01, and for values greater than T (I>T), these bits are 00. A similar process is applied to the Q component to determine the upper two bits: values less than −T (Q<T) yield 10, values between −T and 0 (−T<Q<0) yield 11, values between 0 and T (0<Q<T) yield 01, and values greater than T (Q>T) yield 00. The respective two bits from the I component and Q component may be concatenated to generate a four-bit string. The four-bit string may then be processed by the LUT offset generator 804.

After determining the correct region, the LUT offset generator 804 uses the upper bits to generate a specific offset to center the signal to the mother 1 k-QAM, albeit with some residual noise. By subtracting this offset from the received modified super-QAM signal, via a combining operation 810, the signal is now a ten-bit signal that is re-centered back to the 1 k-QAM constellation, which is then processed by the LLR generator 504 and the LDPC decoder 506 for error correction and decoding, respectively.

In some examples, the upper bits generated by the hard slicing operation performed by, for example, the hard slicer 802, may be concatenated with an output of the LDPC decoder 506. In some such examples, a de-splitting operation 808 may perform the concentration to generate a concatenated output (for example, a twelve-bit or fourteen-bit output). A CRC module 806 may perform a CRC on the concatenated bits.

In some other examples, the receiver 800 does not concatenate the upper bits (for example, the first set of bits) with the lower bits (for example, the second set of bits). In such examples, the receiver delivers two distinct groups of bits: one group consisting exclusively of the upper bits, and the other group including the lower bits. Both groups collectively form the transport block (TB). In such examples, the CRC module 806 may perform a CRC on the two distinct groups of bits. Likewise, when a transmitter, such as the transmitter 700 described with reference to FIG. 7, transmits the upper bits and the lower bits, the upper bits, and lower bits may be concatenated into one group of bits or transmitted as two distinct groups of bits, where both groups form the TB. In such examples, the transmitter is informed about the TB's structure.

Figure 9:
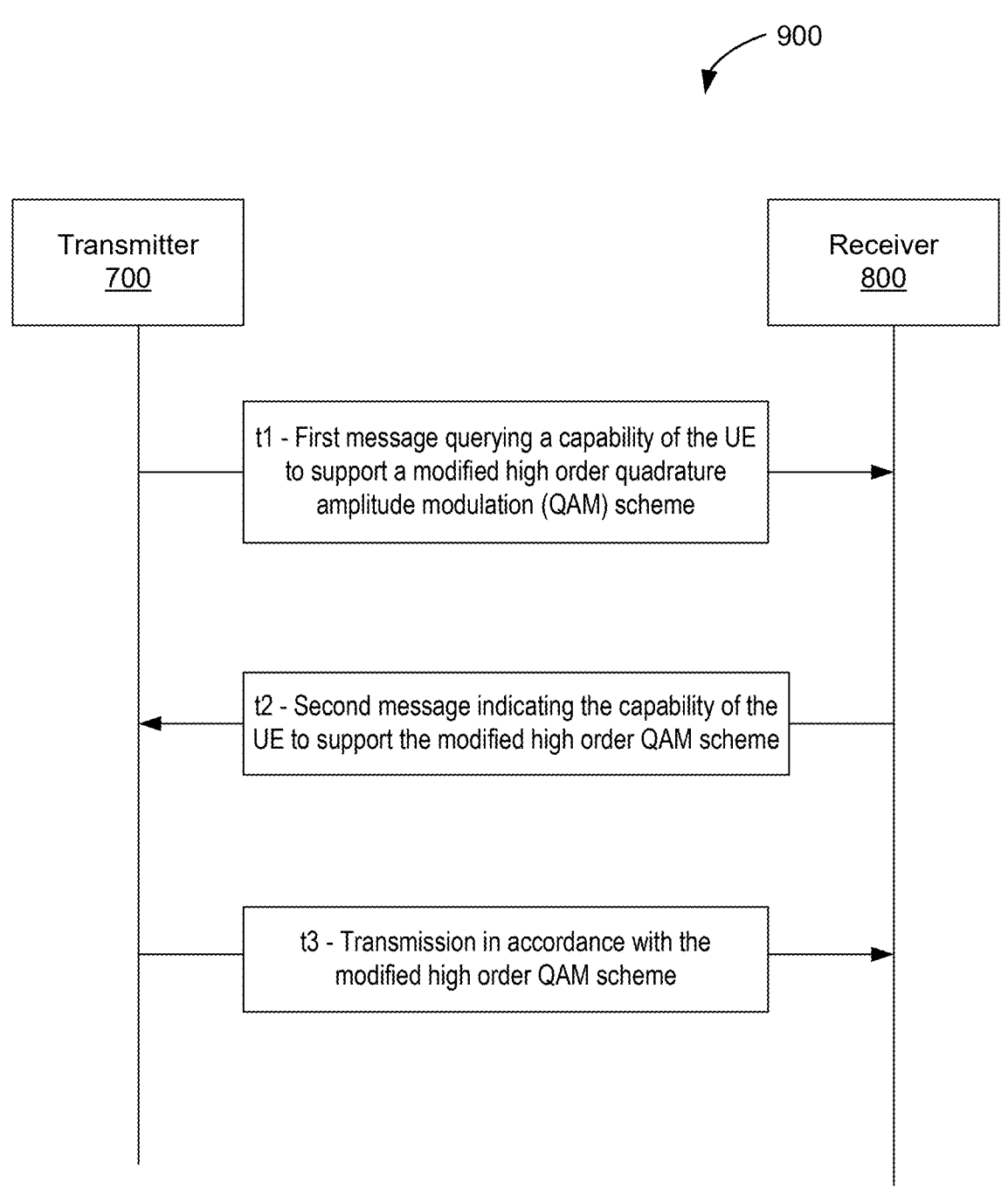
FIG. 9 is a timing diagram illustrating an example of a transmitter and a receiver communicating in accordance with a modified super-QAM scheme, in accordance with various aspects of the present disclosure.

FIG. 9 is a timing diagram illustrating an example 900 of a transmitter 700 and a receiver 800 communicating in accordance with a modified super-QAM scheme, in accordance with various aspects of the present disclosure. In the example of FIG. 9, at time t1, the transmitter 700 transmits, to the receiver 800, a first message querying a capability of the UE to support a modified high order QAM scheme (for example, a 4 k-QAM scheme or a 16 k-QAM scheme). The modified high order QAM scheme may also be referred to as a modified super-QAM scheme, hereinafter used interchangeably. The modified high order QAM scheme may be associated with a first constellation having a first group of regions, such as four regions or sixteen regions. Each region of the first constellation may include a respective second constellation having a second group of regions (for example, four quadrants) that is associated with a low order QAM scheme (for example, a 1 k-QAM scheme). Each one of the first constellations may be separated from adjacent first constellations by a gap that is larger than a spacing between adjacent constellation points in any one of the second constellations.

As shown in the example 900, at time t2, the transmitter 700 receives, from the receiver 800, a second message indicating the capability of the receiver 800 to support the modified high order QAM scheme in accordance with receiving the first message. The first message at time t1 and the second message at time t2 may be MAC-CE messages. At time t3, the transmitter 700 transmits, to the receiver 800, a transmission in accordance with the modified high order QAM scheme. The transmission may convey a group of symbols. Each symbol of the group of symbols may indicate a respective group of bits that includes a first set of bits indicating a respective first region of the first group of regions associated with the modified high order QAM scheme, and a second set of encoded bits. The second set of encoded bits may be associated with a second region of the second group of regions associated with the low order QAM scheme that are represented in the respective first region associated with the modified high order QAM scheme. The receiver 800 may process the transmission in accordance with the hardware and software modules described with reference to the example of FIG. 8.

Aspects of the present disclosure are not limited to a 4 k-QAM scheme. In some examples, hardware specified to process 10 bits per symbol for a 1 k-QAM scheme may be used for a modified 16 k-QAM scheme that is specified to carry 14 bits per symbol. In such examples, a modulation constellation associated with the modified 16 k-QAM scheme may be synthesized from sixteen offset replicas of a modulation constellation associated with the 1 k-QAM scheme. The modulation constellation associated with the 1 k-QAM scheme may be referred to as the 1 k-QAM constellation and the modulation constellation associated with the 16 k-QAM scheme may be referred to as the 16 k-QAM constellation. In such examples, the 1 k-QAM scheme continues to function as per the current specifications. Specifically, ten bits per symbol may be mapped to a quadrant of the 1 k-QAM constellation using conventional mapping, such as gray coding or other defined mapping functions. To enable the additional data capacity of the 16 k-QAM scheme, four new bits may indicate a specific region of the sixteen offset replica regions within the overall 16 k-QAM constellation. Thus, these four bits expand the effective constellation of the mother QAM without altering the inherent mapping of the original 10 bits.

Figure 10A:
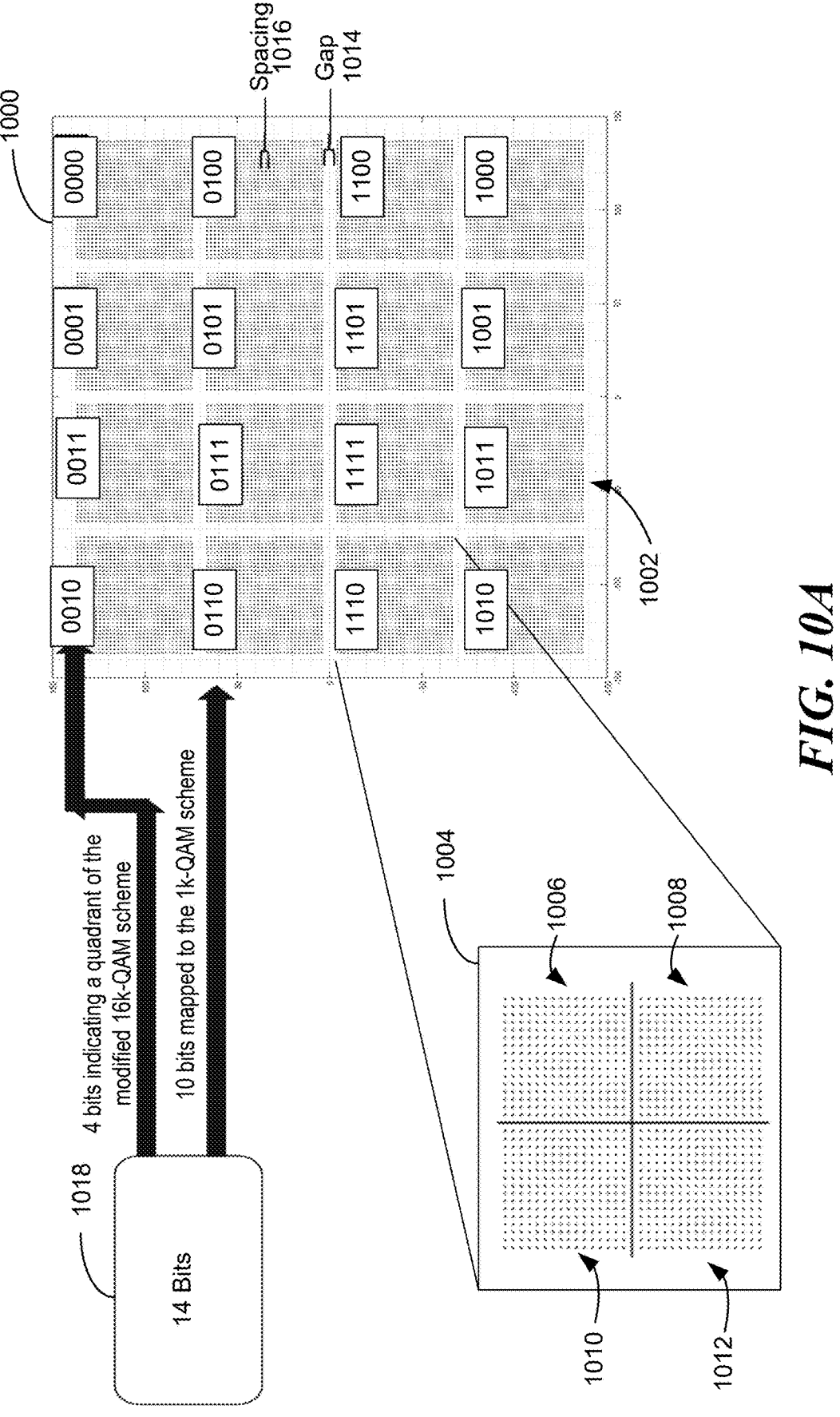
FIG. 10A is a block diagram illustrating an example of a modified 16,384 (16 k-) QAM scheme, in accordance with various aspects of the present disclosure.

FIG. 10A is a block diagram illustrating an example of a modified 16 k-QAM scheme, in accordance with various aspects of the present disclosure. In the example of FIG. 10A, the modified 16 k-QAM scheme is associated with a 16 k-QAM constellation 1000 having sixteen regions 1002 (for ease of explanation, only one region is labeled). Each region 1002 of the 16 k-QAM constellation 1000 includes a respective 1 k-QAM constellation 1004, having four quadrants 1006, 1008, 1010, and 1012. For ease of explanation, only one 1 k-QAM constellation 1004 is illustrated in the example of FIG. 10A. Each region 1002 of the 16 k-QAM constellation 1000 may be separated from an adjacent region 1002 by a gap 1014 that is larger than a spacing 1016 between adjacent constellation points in any one of the quadrants in the 1 k-QAM constellation 1004.

In the example of FIG. 10A, a UE may receive, from a network node, one or more transmissions in accordance with the modified 16 k-QAM scheme. Each transmission may convey a group of symbols, and each symbol 1018 of the group of symbols indicates a respective group of bits. Specifically, for the modified 16 k-QAM scheme, each symbol 1018 of the group of symbols indicates 14 bits. In such examples, four bits indicate a first region of the sixteen quadrants 1002 associated with the 16 k-QAM constellation 1000. As shown in the example of FIG. 10A, each of the sixteen regions 1002 may be associated with a four-bit binary number ranging from "0000" to "1100". Therefore, the four bits may correspond to the four-bit binary number associated with one of the sixteen regions 1002. Furthermore, the remaining ten bits may be encoded bits that are associated with a second quadrant of the four quadrants 1006, 1008, 1010, and 1012, associated with the one 1 k-QAM constellation 1004, that are included in the first region, of the 16 k-QAM constellation 1000. In some examples, an amplitude and a phase of the remaining ten bits indicate the respective second quadrant of the four quadrants 1006, 1008, 1010, and 1012, associated with the one 1 k-QAM constellation 1004. The ten bits may be mapped to the respective second quadrant via conventional QAM mapping, such as gray mapping or another mapping.

Figure 10B:
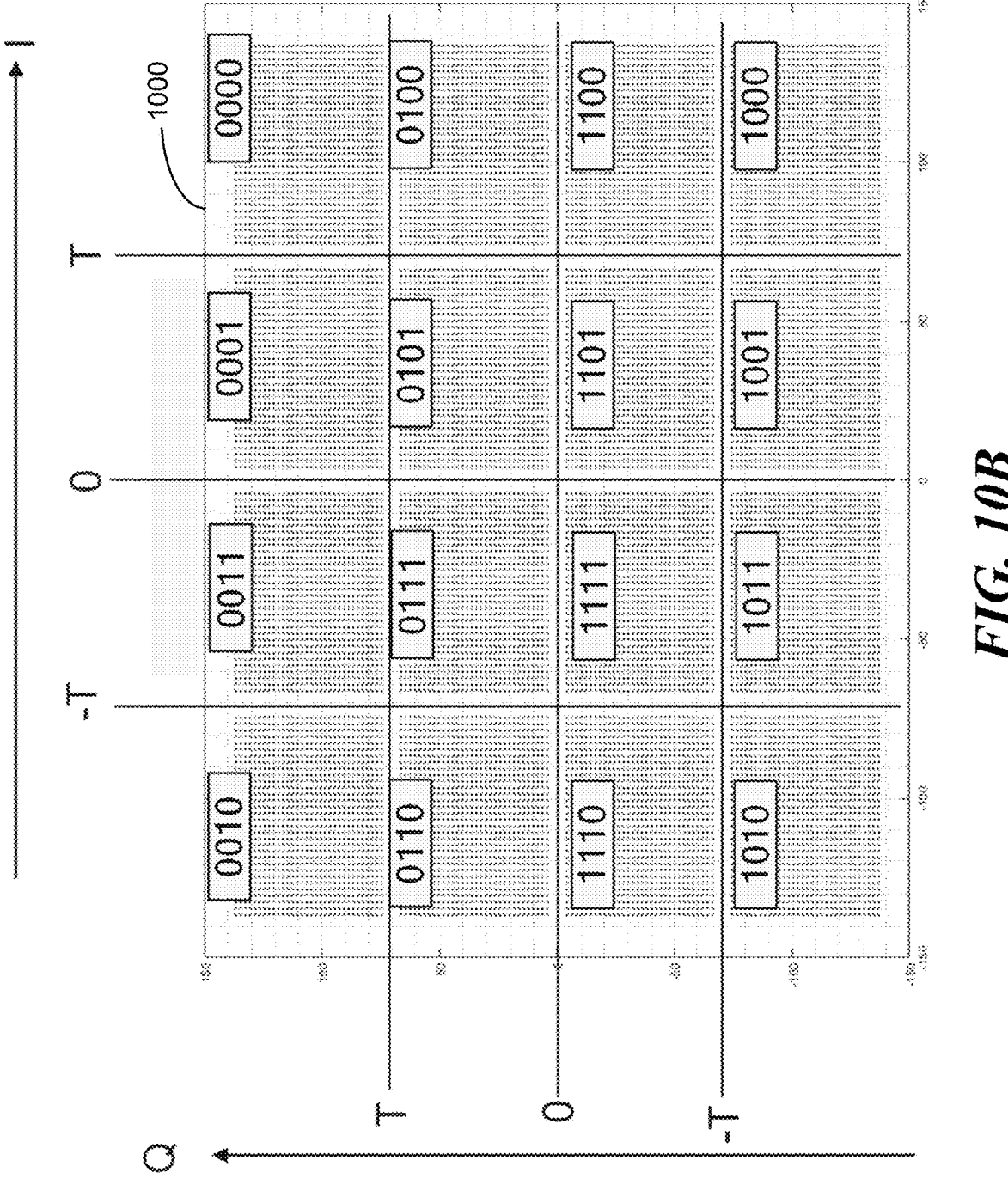
FIG. 10B is a diagram illustrating an example of the 16 k-QAM constellation with corresponding thresholds used to determine a region based on the in-phase and quadrature of a signal, in accordance with various aspects of the present disclosure.

As described with reference to FIG. 8, for a 16 k-QAM scheme, a hard slicer processes the in-phase (I) and quadrature (Q) components separately. The operation begins by comparing each component against three defined thresholds: 0, a positive threshold (T), and a negative threshold (−T). FIG. 10B is a diagram illustrating an example of the 16 k-QAM constellation 1000 with corresponding thresholds used to determine a region based on the in-phase and quadrature of a signal, in accordance with various aspects of the present disclosure. As discussed, in some examples, for the I component, if the value is less than −T (I←−T), the lower two bits are set to "10". If the value is between −T and 0 (−T<I<0), the lower two bits are set to 11. For values between 0 and T (0<I<T), the lower two bits are 01, and for values greater than T (I>T), these bits are 00. A similar process is applied to the Q component to determine the upper two bits: values less than −T (Q<T) yield 10, values between −T and 0 (−T<Q<0) yield 11, values between 0 and T (0<Q<T) yield 01, and values greater than T (Q>T) yield 00.

FIG. 11 is a block diagram illustrating an example wireless communication device 1100 that supports selectively updating a frequency-dependent subband impairment estimate, in accordance with various aspects of the present disclosure. The device 1100 may be an example of aspects of a receiver 800 described with reference to FIGS. 8 and 9. The wireless communication device 1100 may include a receiver 1110, a communications manager 1105, a transmitter 1120, a QAM capability component 1130, and a symbol processing component 1140, which may be in communication with one another (for example, via one or more buses). In some examples, the wireless communication device 1100 is configured to perform operations, including operations of the process 1200 described below with reference to FIG. 12.

In some examples, the wireless communication device 1100 can include a chip, chipset, package, or device that includes at least one processor and at least one modem (for example, a 5G modem or other cellular modem). In some examples, the communications manager 1105, or its subcomponents, may be separate and distinct components. In some examples, at least some components of the communications manager 1105 are implemented at least in part as software stored in a memory. For example, portions of one or more of the components of the communications manager 1105 can be implemented as non-transitory code executable by the processor to perform the functions or operations of the respective component.

The receiver 1110 may receive one or more of reference signals (for example, periodically configured channel state information reference signals (CSI-RSs), aperiodically configured CSI-RSs, or multi-beam-specific reference signals), synchronization signals (for example, synchronization signal blocks (SSBs)), control information and data information, such as in the form of packets, from one or more other wireless communication devices via various channels including control channels (for example, a physical downlink control channel (PDCCH), physical uplink control channel (PUCCH), or physical shared control channel (PSCCH)) and data channels (for example, a physical downlink shared channel (PDSCH), physical sidelink shared channel (PSSCH), a physical uplink shared channel (PUSCH)). The other wireless communication devices may include, but are not limited to, a base station 110 described with reference to FIGS. 1 and 2, a DU 330, an RU 340, or a CU 310 described with reference to FIG. 3, or a UE 120 described with reference to FIGS. 1, 2, and 3.

The received information may be passed on to other components of the device 1100. The receiver 1110 may be an example of aspects of the receive processor 258 described with reference to FIG. 2. The receiver 1110 may include a set of radio frequency (RF) chains that are coupled with or otherwise utilize a set of antennas (for example, the set of antennas may be an example of aspects of the antennas 252 described with reference to FIG. 2).

The transmitter 1120 may transmit signals generated by the communications manager 1105 or other components of the wireless communication device 1100. In some examples, the transmitter 1120 may be collocated with the receiver 1110 in a transceiver. The transmitter 1120 may be an example of aspects of the transmit processor 264 described with reference to FIG. 2. The transmitter 1120 may be coupled with or otherwise utilize a set of antennas (for example, the set of antennas may be an example of aspects of the antennas 252 described with reference to FIG. 2), which may be antenna elements shared with the receiver 1110. In some examples, the transmitter 1120 is configured to transmit control information in a PUCCH, PSCCH, or PDCCH and data in a physical uplink shared channel (PUSCH), PSSCH, or PDSCH.

The communications manager 1105 may be an example of aspects of the controller/processor 280 described with reference to FIG. 2. The communications manager 1105 may include the QAM capability component 1130 and the symbol processing component 1140. In some examples, working in conjunction with the receiver 1110, the QAM capability component 1130 receives, from a network node, a first message querying a capability of the UE to support a modified high order QAM scheme associated with a first constellation having a first group of regions. Each region of the first group of regions may represent a respective second constellation associated with a low order QAM scheme. Additionally, each region of the first group of regions being separated from each adjacent region of the first group of regions by a gap that is larger than a spacing between adjacent constellation points in any one of the second constellations. Additionally, working in conjunction with the transmitter 1120, the QAM capability component 1130 transmits, to the network node, a second message indicating the capability of the UE to support the modified high order QAM scheme in accordance with receiving the first message. Furthermore, working in conjunction with the receiver 1110 and/or the QAM capability component 1130, the symbol processing component 1140 receives, from the network node, a transmission in accordance with the modified high order QAM scheme. The transmission conveys a group of symbols, each symbol of the group of symbols indicating a respective group of bits that includes: a first set of bits indicating a first region of the first group of regions associated with the modified high order QAM scheme, and a second set of encoded bits indicating a constellation point in a respective second constellation comprised in the first region.

FIG. 12 is a flow diagram illustrating an example of a process 1200 for communicating in accordance with a modified high order QAM scheme, in accordance with various aspects of the present disclosure. The process 1200 may be performed by a receiver, such as a receiver 800 described with respect to FIGS. 8 and 9. As shown in the example of FIG. 12, the process begins at block 1202 by receiving, from a network node, a first message querying a capability of the UE to support a modified high order QAM scheme associated with a first constellation having a first group of regions. Each region of the first group of regions may represent a respective second constellation associated with a low order QAM scheme. Additionally, each region of the first group of regions being separated from each adjacent region of the first group of regions by a gap that is larger than a spacing between adjacent constellation points in any one of the second constellations. At block 1204, the process 1200 transmits, to the network node, a second message indicating the capability of the UE to support the modified high order QAM scheme in accordance with receiving the first message. At block 1206, the process 1200 receives, from the network node, a transmission in accordance with the modified high order QAM scheme. The transmission conveys a group of symbols, each symbol of the group of symbols indicating a respective group of bits that includes: a first set of bits indicating a first region of the first group of regions associated with the modified high order QAM scheme, and a second set of encoded bits indicating a constellation point in a respective second constellation comprised in the first region.

Figure 13:
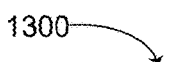
FIG. 13 is a block diagram illustrating an example wireless communication device that supports a modified high order QAM scheme, in accordance with various aspects of the present disclosure.

FIG. 13 is a block diagram illustrating an example wireless communication device 1300 that supports a modified high order QAM scheme, in accordance with various aspects of the present disclosure. The device 1300 may be an example of aspects of a transmitter 700 described with respect to FIGS. 7 and 9. The wireless communication device 1300 may include a receiver 1310, a communications manager 1305, a transmitter 1320, a QAM capability component 1330, and a symbol processing component 1340, which may be in communication with one another (for example, via one or more buses). In some examples, the wireless communication device 1300 is configured to perform operations, including operations of the process 1400 described below with reference to FIG. 14.

In some examples, the wireless communication device 1300 can include a chip, chipset, package, or device that includes at least one processor and at least one modem (for example, a 5G modem or other cellular modem). In some examples, the communications manager 1305, or its subcomponents, may be separate and distinct components. In some examples, at least some components of the communications manager 1305 are implemented at least in part as software stored in a memory. For example, portions of one or more of the components of the communications manager 1305 can be implemented as non-transitory code executable by the processor to perform the functions or operations of the respective component.

The receiver 1310 may receive one or more of reference signals (for example, periodically configured CSI-RSs, aperiodically configured CSI-RSs, or multi-beam-specific reference signals), synchronization signals (for example, synchronization signal blocks (SSBs)), control information and data information, such as in the form of packets, from one or more other wireless communication devices via various channels including control channels (for example, a PDCCH, PUCCH, or PSCCH) and data channels (for example, a PDSCH, PSSCH, a PUSCH). The other wireless communication devices may include, but are not limited to, a base station 110 described with reference to FIGS. 1 and 2, a DU 330, an RU 340, or a CU 310 described with reference to FIG. 3, or a UE 120 described with reference to FIGS. 1, 2, and 3.

The received information may be passed on to other components of the device 1300. The receiver 1310 may be an example of aspects of the receive processor 258 described with reference to FIG. 2. The receiver 1310 may include a set of radio frequency (RF) chains that are coupled with or otherwise utilize a set of antennas (for example, the set of antennas may be an example of aspects of the antennas 252 described with reference to FIG. 2).

The transmitter 1320 may transmit signals generated by the communications manager 1305 or other components of the wireless communication device 1300. In some examples, the transmitter 1320 may be collocated with the receiver 1310 in a transceiver. The transmitter 1320 may be an example of aspects of the transmit processor 264 described with reference to FIG. 2. The transmitter 1320 may be coupled with or otherwise utilize a set of antennas (for example, the set of antennas may be an example of aspects of the antennas 252 described with reference to FIG. 2), which may be antenna elements shared with the receiver 1310. In some examples, the transmitter 1320 is configured to transmit control information in a PUCCH, PSCCH, or PDCCH and data in a physical uplink shared channel (PUSCH), PSSCH, or PDSCH.

The communications manager 1305 may be an example of aspects of the controller/processor 280 described with reference to FIG. 2. The communications manager 1305 may include the QAM capability component 1330 and the symbol processing component 1340. In some examples, working in conjunction with the transmitter 1320, the QAM capability component 1330 transmits a first message querying a capability of a UE to support a modified high order QAM scheme associated with a first constellation having a first group of regions. Each region of the first group of regions represents a respective second constellation associated with a low order QAM scheme. Additionally, each region of the first group of regions may be separated from each adjacent region of the first group of regions by a gap that is larger than a spacing between adjacent constellation points in any one of the second constellations. Additionally, working in conjunction with the receiver 1310, the QAM capability component 1330 receives, from the UE, a second message indicating the capability of the UE to support the modified high order QAM scheme in accordance with receiving the first message. Furthermore, working in conjunction with the transmitter 1320 and/or the QAM capability component 1330, the symbol processing component 1340 transmits a transmission in accordance with the modified high order QAM scheme. The transmission conveys a group of symbols, each symbol of the group of symbols indicating a respective group of bits that includes: a first set of bits indicating a first region of the first group of regions associated with the modified high order QAM scheme, and a second set of encoded bits indicating a constellation point in a respective second constellation comprised in the first region.

FIG. 14 is a flow diagram illustrating an example of a process 1400 for communicating in accordance with a modified high order QAM scheme, in accordance with various aspects of the present disclosure. The process 1400 may be performed by a transmitter, such as a transmitter 700 described with respect to FIGS. 7 and 9. As shown in the example of FIG. 14, the process 1400 begins at block 1402 by transmitting a first message querying a capability of a UE to support a modified high order QAM scheme associated with a first constellation having a first group of regions. Each region of the first group of regions represents a respective second constellation associated with a low order QAM scheme. Additionally, each region of the first group of regions may be separated from each adjacent region of the first group of regions by a gap that is larger than a spacing between adjacent constellation points in any one of the second constellations. At block 1404, the process 1400 receives, from the UE, a second message indicating the capability of the UE to support the modified high order QAM scheme in accordance with receiving the first message. At block 1406, the process 1400 transmits a transmission in accordance with the modified high order QAM scheme. The transmission conveys a group of symbols, each symbol of the group of symbols indicating a respective group of bits that includes: a first set of bits indicating a first region of the first group of regions associated with the modified high order QAM scheme, and a second set of encoded bits indicating a constellation point in a respective second constellation comprised in the first region.

Implementation examples are described in the following numbered clauses:

Clause 1. A method for wireless communication at a UE, comprising: receiving, from a network node, a first message querying a capability of the UE to support a modified high order QAM scheme associated with a first constellation having a first group of regions, each region of the first constellation comprising a respective second constellation associated with a low order QAM scheme, each region of the first group of regions being separated from each adjacent region of the first group of regions by a gap that is larger than a spacing between adjacent constellation points in any one of the second constellations; transmitting, to the network node, a second message indicating the capability of the UE to support the modified high order QAM scheme in accordance with receiving the first message; and receiving, from the network node, a transmission in accordance with the modified high order QAM scheme, the transmission conveying a group of symbols, each symbol of the group of symbols indicating a respective group of bits that includes: a first set of bits indicating a first region of the first group of regions associated with the modified high order QAM scheme, and a second set of encoded bits indicating a constellation point in a respective second constellation comprised in the first region.

Clause 2. The method of Clause 1, wherein, for the respective group of bits included in each symbol of the group of symbols, an amplitude and a phase associated with the second set of encoded bits indicates the constellation point in the respective second constellation.

Clause 3. The method of Clause 2, further comprising, for the respective group of bits of each symbol of the group of symbols: extracting, via a hard-slicing operation, the first set of bits; and decoding the second set of encoded bits in accordance with the amplitude and the phase.

Clause 4. The method of Clause 3, further comprising concatenating the first set of bits with the decoded second set of bits.

Clause 5. The method of any one of Clauses 1-4, wherein the low order QAM scheme is a 1 k-QAM scheme and each of the second constellations comprises four regions.

Clause 6. The method of any one of Clauses 1-5, wherein: the modified high order QAM scheme is a 4 k-QAM scheme; a quantity of the first set of bits is two; a quantity of the second set of encoded bits is ten; and the first group of regions consists of four regions.

Clause 7. The method of any one of Clauses 1-5, wherein: the modified high order QAM scheme is a 16 k-QAM scheme; a quantity of the first set of bits is four; a quantity of the second set of encoded bits is ten; and the first group of regions consists of sixteen regions.

Clause 8. The method of any one of Clauses 1-7, wherein the first message and the second message are MAC-CE messages.

Clause 9. A method for wireless communication at a network node, comprising: transmitting a first message querying a capability of a UE to support a modified high order QAM scheme associated with a first constellation having a first group of regions, each region of the first constellation comprising a respective second constellation associated with a low order QAM scheme, each region of the first group of regions being separated from each adjacent region of the first group of regions by a gap that is larger than a spacing between adjacent constellation points in any one of the second constellations; receiving, from the UE, a second message indicating the capability of the UE to support the modified high order QAM scheme in accordance with receiving the first message; and transmitting a transmission in accordance with the modified high order QAM scheme, the transmission conveying a group of symbols, each symbol of the group of symbols indicating a respective group of bits that includes: a first set of bits indicating a first region of the first group of regions associated with the modified high order QAM scheme, and a second set of encoded bits indicating a constellation point in a respective second constellation comprised in the first region.

Clause 10. The method of Clause 9, wherein, for the respective group of bits included in each symbol of the group of symbols, an amplitude and a phase associated with the second set of encoded bits indicates the constellation point in the respective second constellation.

Clause 11. The method of any one of Clauses 9-10, wherein the low order QAM scheme is a 1 k-QAM scheme and each of the second constellations comprises four regions.

Clause 12. The method of any one of Clause 9-11, wherein: the modified high order QAM scheme is a 4 k-QAM scheme; a quantity of the first set of bits is two; a quantity of the second set of encoded bits is ten; and the first group of regions consists of four regions.

Clause 13. The method of any one of Clause 9-11, wherein: the modified high order QAM scheme is a 16 k-QAM scheme; a quantity of the first set of bits is four; a quantity of the second set of encoded bits is ten; and the first group of regions consists of sixteen regions.

Clause 14. The method of any one of Clauses 9-13, wherein the first message and the second message are MAC-CE messages.

Clause 15. An apparatus comprising a processor, memory coupled with the processor, and instructions stored in the memory and operable, when executed by the processor to cause the apparatus to perform any one of Clauses 1-8.

Clause 16. An apparatus comprising at least one means for performing any one of Clauses 1-8.

Clause 17. A computer program comprising code for causing an apparatus to perform any one of Clauses 1-8.

Clause 18. An apparatus comprising a processor, memory coupled with the processor, and instructions stored in the memory and operable, when executed by the processor to cause the apparatus to perform any one of Clauses 9-14.

Clause 19. An apparatus comprising at least one means for performing any one of Clauses 9-14.

Clause 20. A computer program comprising code for causing an apparatus to perform any one of Clauses 9-14.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (for example, related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method for wireless communication at a user equipment (UE), comprising:

receiving, from a network node, a first message querying a capability of the UE to decode transmissions modulated in accordance with a modified high order quadrature amplitude modulation (QAM) scheme associated with a first constellation having a first group of regions, each region of the first group of regions comprising a respective second constellation associated with a low order QAM scheme, each region of the first group of regions being separated from each adjacent region of the first group of regions by a gap that is larger than a spacing between adjacent constellation points in any one of the second constellations;

transmitting, to the network node, a second message indicating the capability of the UE to decode the transmissions modulated in accordance with the modified high order QAM scheme in accordance with receiving the first message; and receiving, from the network node, a transmission in accordance with the modified high order QAM scheme, the transmission conveying a group of symbols, each symbol of the group of symbols indicating a respective group of bits that includes:

a first set of bits indicating a first region of the first group of regions associated with the modified high order QAM scheme, and a second set of encoded bits indicating a constellation point in a respective second constellation comprised in the first region.

2. The method of claim 1, wherein, for the respective group of bits included in each symbol of the group of symbols, an amplitude and a phase associated with the second set of encoded bits indicates the constellation point in the respective second constellation.

3. The method of claim 2, further comprising, for the respective group of bits of each symbol of the group of symbols:

extracting, via a hard-slicing operation, the first set of bits; and decoding the second set of encoded bits in accordance with the amplitude and the phase.

4. The method of claim 3, further comprising concatenating the first set of bits with the decoded second set of bits.

5. The method of claim 1, wherein the low order QAM scheme is a 1024 (1 k-) QAM scheme and each of the second constellations comprises four regions.

6. The method of claim 5, wherein:

the modified high order QAM scheme is a 4096 (4 k-) QAM scheme;

a quantity of the first set of bits is two;

a quantity of the second set of encoded bits is ten; and the first group of regions consists of four regions.

7. The method of claim 5, wherein:

the modified high order QAM scheme is a 16,384 (16 k-) QAM scheme;

a quantity of the first set of bits is four;

a quantity of the second set of encoded bits is ten; and the first group of regions consists of sixteen regions.

8. The method of claim 1, wherein the first message and the second message are medium access control (MAC) control element (CE) (MAC-CE) messages.

9. A user equipment (UE), comprising:

one or more processors; and one or more memories coupled with the one or more processors and storing processor-executable code that, when executed by the one or more processors, is configured to cause the UE to:

receive, from a network node, a first message querying a capability of the UE to decode transmissions modulated in accordance with a modified high order quadrature amplitude modulation (QAM) scheme associated with a first constellation having a first group of regions, each region of the first group of regions comprising a respective second constellation associated with a low order QAM scheme, each region of the first group of regions being separated from each adjacent region of the first group of regions by a gap that is larger than a spacing between adjacent constellation points in any one of the second constellations;

transmit, to the network node, a second message indicating the capability of the UE to decode the transmissions modulated in accordance with the modified high order QAM scheme in accordance with receiving the first message; and receive, from the network node, a transmission in accordance with the modified high order QAM scheme, the transmission conveying a group of symbols, each symbol of the group of symbols indicating a respective group of bits that includes:

a first set of bits indicating a first region of the first group of regions associated with the modified high order QAM scheme, and a second set of encoded bits indicating a constellation point in a respective second constellation comprised in the first region.

10. The UE of claim 9, wherein, for the respective group of bits included in each symbol of the group of symbols, an amplitude and a phase associated with the second set of encoded bits indicates the constellation point in the respective second constellation.

11. The UE of claim 10, wherein execution of the processor-executable code further causes the UE to, for the respective group of bits of each symbol of the group of symbols:

extract, via a hard-slicing operation, the first set of bits; and decode the second set of encoded bits in accordance with the amplitude and the phase.

12. The UE of claim 11, wherein execution of the processor-executable code further causes the UE to concatenate the first set of bits with the decoded second set of bits.

13. The UE of claim 9, wherein the low order QAM scheme is a 1024 (1 k-) QAM scheme and each of the second constellations comprises four regions.

14. The UE of claim 13, wherein:

the modified high order QAM scheme is a 4096 (4 k-) QAM scheme;

a quantity of the first set of bits is two;

a quantity of the second set of encoded bits is ten; and the first group of regions consists of four regions.

15. The UE of claim 13, wherein:

the modified high order QAM scheme is a 16,384 (16 k-) QAM scheme;

a quantity of the first set of bits is four;

a quantity of the second set of encoded bits is ten; and the first group of regions consists of sixteen regions.

16. The UE of claim 9, wherein the first message and the second message are medium access control (MAC) control element (CE) (MAC-CE) messages.

17. A method for wireless communication at a network node, comprising:

transmitting a first message querying a capability of a user equipment (UE) to decode transmissions modulated in accordance with a modified high order quadrature amplitude modulation (QAM) scheme associated with a first constellation having a first group of regions, each region of the first group of regions comprising a respective second constellation associated with a low order QAM scheme, each region of the first group of regions being separated from each adjacent region of the first group of regions by a gap that is larger than a spacing between adjacent constellation points in any one of the second constellations;

receiving, from the UE, a second message indicating the capability of the UE to decode the transmissions modulated in accordance with the modified high order QAM scheme in accordance with receiving the first message; and transmitting a transmission in accordance with the modified high order QAM scheme, the transmission conveying a group of symbols, each symbol of the group of symbols indicating a respective group of bits that includes:

a first set of bits indicating a first region of the first group of regions associated with the modified high order QAM scheme, and a second set of encoded bits indicating a constellation point in a respective second constellation comprised in the first region.

18. The method of claim 17, wherein, for the respective group of bits included in each symbol of the group of symbols, an amplitude and a phase associated with the second set of encoded bits indicates the constellation point in the respective second constellation.

19. The method of claim 17, wherein the low order QAM scheme is a 1024 (1 k-) QAM scheme and each of the second constellations comprises four regions.

20. The method of claim 19, wherein:

the modified high order QAM scheme is a 4096 (4 k-) QAM scheme;

a quantity of the first set of bits is two;

a quantity of the second set of encoded bits is ten; and the first group of regions consists of four regions.

21. The method of claim 19, wherein:

the modified high order QAM scheme is a 16,384 (16 k-) QAM scheme;

a quantity of the first set of bits is four;

a quantity of the second set of encoded bits is ten; and the first group of regions consists of sixteen regions.

22. The method of claim 17, wherein the first message and the second message are medium access control (MAC) control element (CE) (MAC-CE) messages.

23. A network node, comprising:

one or more processors; and one or more memories coupled with the one or more processors and storing processor-executable code that, when executed by the one or more processors, is configured to cause the network node to:

transmit a first message querying a capability of a user equipment (UE) to decode transmissions modulated in accordance with a modified high order quadrature amplitude modulation (QAM) scheme associated with a first constellation having a first group of regions, each region of the first group of regions comprising a respective second constellation associated with a low order QAM scheme, each region of the first group of regions being separated from each adjacent region of the first group of regions by a gap that is larger than a spacing between adjacent constellation points in any one of the second constellations;

receive, from the UE, a second message indicating the capability of the UE to decode the transmissions modulated in accordance with the modified high order QAM scheme in accordance with receiving the first message; and transmit a transmission in accordance with the modified high order QAM scheme, the transmission conveying a group of symbols, each symbol of the group of symbols indicating a respective group of bits that includes:

a first set of bits indicating a first region of the first group of regions associated with the modified high order QAM scheme, and a second set of encoded bits indicating a constellation point in a respective second constellation comprised in the first region.

24. The network node of claim 23, wherein, for the respective group of bits included in each symbol of the group of symbols, an amplitude and a phase associated with the second set of encoded bits indicates the constellation point in the respective second constellation.

25. The network node of claim 23, wherein the low order QAM scheme is a 1024 (1 k-) QAM scheme and each of the second constellations comprises four regions.

26. The network node of claim 25, wherein:

the modified high order QAM scheme is a 4096 (4 k-) QAM scheme;

a quantity of the first set of bits is two;

a quantity of the second set of encoded bits is ten; and the first group of regions consists of four regions.

27. The network node of claim 25, wherein:

the modified high order QAM scheme is a 16,384 (16 k-) QAM scheme;

a quantity of the first set of bits is four;

a quantity of the second set of encoded bits is ten; and the first group of regions consists of sixteen regions.

28. The network node of claim 23, wherein the first message and the second message are medium access control (MAC) control element (CE) (MAC-CE) messages.

\* \* \* \* \*